United States Patent
Yan et al.

(10) Patent No.: US 10,789,078 B2
(45) Date of Patent: Sep. 29, 2020

(54) METHOD AND SYSTEM FOR INPUTTING INFORMATION

(71) Applicant: Alibaba Group Holding Limited, George Town (KY)

(72) Inventors: Yue Yan, Beijing (CN); Gang Cheng, Beijing (CN); Lisha Qiao, Beijing (CN)

(73) Assignee: Alibaba Group Holding Limited (KY)

( * ) Notice: Subject to any disclaimer, the term of this patent is extended or adjusted under 35 U.S.C. 154(b) by 369 days.

(21) Appl. No.: 15/369,673

(22) Filed: Dec. 5, 2016

(65) Prior Publication Data

US 2017/0160879 A1 Jun. 8, 2017

(30) Foreign Application Priority Data

Dec. 8, 2015 (CN) .......................... 2015 1 0896383

(51) Int. Cl.
*G06F 3/00* (2006.01)
*G06F 9/451* (2018.01)
*G06F 3/023* (2006.01)
*G06F 3/0489* (2013.01)

(52) U.S. Cl.
CPC ............ *G06F 9/451* (2018.02); *G06F 3/0236* (2013.01); *G06F 3/0237* (2013.01); *G06F 3/04895* (2013.01)

(58) Field of Classification Search
CPC .. G06F 3/04842; G06F 3/0482; G06F 9/4843; G06F 9/4881; G06F 9/5044; G06F 3/04883; G06F 9/5016; G06F 9/5027; G06F 9/445; G06F 9/5094; G06F 16/9535; G06F 19/00; G06F 3/0481; G06F 9/451; G06F 9/4893; G06F 9/50; G06F 9/546; G06F 3/04817; G06F 3/0488; G06F 8/38; G06F 9/30087; G06F 9/461; G06F 9/48; G06F 9/4818; G06F 9/4887; G06F 9/5005; G06F 9/5011; G06F 9/5038; G06F 9/5055; G06F 9/544; G06F 11/327; G06F 16/00; G06F 19/10; G06F 16/90335

See application file for complete search history.

(56) References Cited

U.S. PATENT DOCUMENTS

| | | | |
|---|---|---|---|
| 5,220,625 | A | 6/1993 | Hatakeyama |
| 6,829,607 | B1 | 12/2004 | Tafoya |
| 7,742,774 | B2 | 6/2010 | Oh |
| 8,688,687 | B1 | 4/2014 | Hoelzle |

(Continued)

FOREIGN PATENT DOCUMENTS

| | | |
|---|---|---|
| CN | 104917669 | 9/2015 |
| CN | 104932786 | 9/2015 |
| GB | 2470585 | 12/2010 |

*Primary Examiner* — Di Xiao
(74) *Attorney, Agent, or Firm* — Van Pelt, Yi & James LLP

(57) ABSTRACT

Inputting information is disclosed including receiving a user input comprising a first string, presenting a plurality of candidates corresponding to the first string, receiving a first trigger instruction directed at a target candidate among the plurality of candidates, the target candidate conforming to a preset rule, and in response to the first trigger instruction, automatically providing expansion content corresponding to the target candidate, the expansion content being content acquired from an application other than an input program.

28 Claims, 23 Drawing Sheets

(56) References Cited

U.S. PATENT DOCUMENTS

| | | | |
|---|---|---|---|
| 2004/0017396 A1* | 1/2004 | Werndorfer | G06F 3/167 |
| | | | 715/751 |
| 2005/0209844 A1 | 9/2005 | Wu | |
| 2005/0216454 A1 | 9/2005 | Diab | |
| 2007/0100619 A1 | 5/2007 | Purho | |
| 2008/0090597 A1 | 4/2008 | Celik | |
| 2012/0123865 A1* | 5/2012 | Salzano | G06Q 30/0257 |
| | | | 705/14.55 |
| 2013/0041960 A1* | 2/2013 | D'Angelo | H04L 12/14 |
| | | | 709/206 |
| 2013/0212475 A1 | 8/2013 | Lee | |
| 2013/0290410 A1* | 10/2013 | Zhang | H04L 67/42 |
| | | | 709/203 |
| 2015/0023548 A1* | 1/2015 | Fukuda | G06K 9/6202 |
| | | | 382/100 |
| 2015/0058747 A1* | 2/2015 | Tetsuhashi | G06F 3/0483 |
| | | | 715/752 |
| 2015/0100537 A1 | 4/2015 | Grieves | |

\* cited by examiner

Tuntun Tel: 5787-5666
Mail box: 1111111@yunos.com

| Cancel | Tuntun | Select all |

Tel: 5787-5666

Mobile: 138-1000-1111

Address: Auxiliary Road to East 3rd Ring Road Middle, Hujialou Subdistrict, Chaoyang District, Beijing...

Mail box: 1111111@yunos.com

METHOD AND SYSTEM FOR INPUTTING INFORMATION

CROSS REFERENCE TO OTHER APPLICATIONS

This application claims priority to People's Republic of China Patent Application No. 201510896383.X entitled A METHOD, A DEVICE AND A SMART TERMINAL FOR INPUTTING INFORMATION, filed Dec. 8, 2015 which is incorporated herein by reference for all purposes.

FIELD OF THE INVENTION

The present application relates to a method and system for inputting information.

BACKGROUND OF THE INVENTION

As mobile phones, tablet computers, and other smart terminals become increasingly widespread, smart terminal functions are also steadily increased. Users utilize smart terminals to perform functions, such as instant messaging, e-mailing, document editing, and web page browsing.

When users use smart terminals to input information, the users often enter more than what is included in the input method dictionary information. Perhaps more often, the users seek information not included in the dictionary information. This additional information may have to be obtained from other applications (apps) executing on the smart terminal. For example, the users may be asked to input a telephone number of a contact, time information, etc.

In conventional information input schemes, users typically input term entry information in an input box of a first app. When information other than dictionary information is desired, the users often are to switch from the first app to a related second app or from the current interface of the first app to another interface and input, based on the system's clipboard as a transfer station, the related information into the input box of the first app. For example, some related information does not support copy/paste operations and must be entered by the user manually. The conventional information input scheme utilizes switching between different apps or different interfaces, and also relies on the storing of relevant information through system clipboards or manual input. Therefore, the switching between different apps or different interfaces diminishes user input efficiency and adds complexity to user operations.

BRIEF DESCRIPTION OF THE DRAWINGS

Various embodiments of the invention are disclosed in the following detailed description and the accompanying drawings.

FIG. 10 is a diagram of yet another example of a presentation interface.

DETAILED DESCRIPTION

Figure 1:
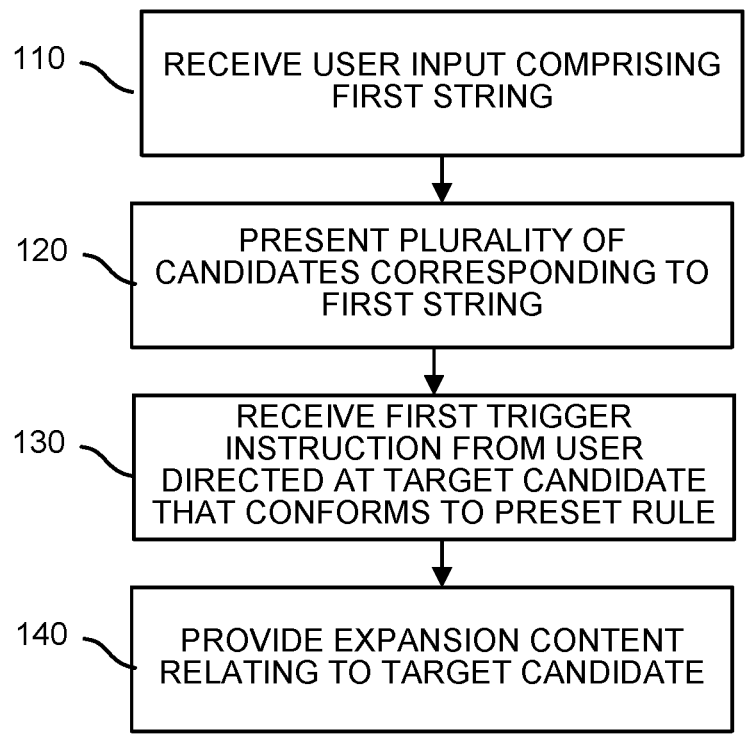
FIG. 1 is a flowchart of an embodiment of a process for inputting information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional processes for inputting information often can only make use of term entry information provided by a dictionary of the input method and cannot provide information other than the entry information of the dictionary, such as the name of a contact. Thus, when a user is to input information other than term entry information, the user is to switch between different apps or different interfaces and also is to store the relevant information. For example, if a user wants to insert the name of a friend stored in Contacts into a text message (SMS), first, the user would switch to an interface for Contacts; second, the user would locate the friend, then copy the name from a popup menu, and lastly, the users would switch back to the text message (SMS) and paste the name of the friend into the input box.

In some cases, for a target candidate that conforms to a preset rule, expansion content is acquired by searching from an internal database or fetching the expansion content through application programming interfaces (APIs) provided by an app other than the input program, and in the event that a first trigger instruction from the user for the target candidate is received, expansion content corresponding to the target candidate is provided to the user. Therefore, in contrast to conventional processes for inputting information that require switching between different apps or different interfaces and require the user to record relevant information, the process of inputting expansion content originating from apps other than the input program can be simplified and therefore, the process can increase user input efficiency.

FIG. 1 is a flowchart of an embodiment of a process for inputting information. In some embodiments, the process 100 is implemented by a client or smart terminal 1600 of FIG. 16 and comprises:

In 110, the client receives a user input comprising a first string.

In 120, the client presents a plurality of candidates corresponding to the first string.

In 130, the client receives a first trigger instruction from a user directed at a target candidate that conforms to a preset rule.

In 140, in response to receiving the first trigger instruction, the client provides, to the user, expansion content relating to the target candidate. In some embodiments, the expansion content is content acquired from another app, the other app being an app other than an input program.

Embodiments of process 100 can be implemented by a computer, a mobile phone, a wearable device, or any other smart terminal in which the input program has been installed. In the event that a user wishes to input information, the user can trigger the input program on the smart terminal to cause the input program through a system-provided interface to be invoked by the current app requiring information input (hereinafter abbreviated as "first app"). For example, when the user opens a smart terminal text message editing interface to input information, the input program is invoked, and the corresponding first app is a communication program (such as a social network service (SNS) app from Google Play, and different from the input program). In another example, when the user opens a smart terminal instant messaging window to input information, the input program is invoked, and the corresponding first app is an instant messaging program.

Assume that the expansion content originates from a second app. In some embodiments, the second app is an app that is the same as the first app. For example, the second app is a communication program for providing communication information. In some embodiments, the second app is also an app that is different from the first app. In another example, the second app is a map app that provides geographic location information. Please note that no restrictions on the first app and the second app are imposed.

The process 100 can be applied to input programs involving keyboard symbols and various other forms of input. In other words, the user inputs letters in a string into an input program, which causes the input program to present candidates corresponding to input strings. Candidates can correspond to entries selected from a dictionary. The input strings can be in the form of text, symbols, icons, etc. For example, a user inputting Chinese characters can input pingyin (a romanized system for representing pronunciations of Chinese characters). Romanized pingyin strings such as "shijian," "riqi," and "wozai" correspond to Chinese character strings candidates for "时间 (time)," "日期 (date)," and "我在 (I am at)," respectively. Operating systems such as iOS® and Microsoft Windows® can provide the character string to pingyin matching. In the following examples, pingyin strings and corresponding Chinese character strings are described for purposes of illustration; however, there are no restrictions as to the specific forms of the candidates. In the field of input methods, all input programs, whether for Chinese, Japanese, Korean or other languages, can convert the user's input string into candidates in an appropriate language.

In some embodiments, input programs typically cannot achieve one-to-one mapping of the input string to text. For example, a pingyin string may correspond to multiple Chinese character strings. Therefore, an input string often corresponds to many candidates. One of the many candidates corresponding to the current input string can conform to a preset rule, while the other candidates do not conform to the preset rule. The preset rule can come from a habit of input (e.g., the preset rule specifies a connection between an input string and an output of a current rule). In this case, the candidate that conforms to the preset rule can be called a target candidate, and the other candidates can be called ordinary candidates.

In some embodiments, the preset rule includes: a date-related rule, in which the expansion content corresponding to the target candidate includes current date information.

In some embodiments, the preset rule includes: a terminal identifier-related rule, in which the expansion content corresponding to the target candidate includes: current terminal identifier information (such as, International Mobile Equipment Identity (IMEI) information can specify a certain device).

In some embodiments, the preset rule includes: a geographic location-related rule, in which the expansion content corresponding to the target candidate comprises: current geographic location information, at least one geographic location object corresponding to the current geographic location information, or a combination thereof. For example, the geographic location object means that the user wants to input location. The current geographic location information can be used to indicate current longitude and latitude information or a current street address (such as, for example, 37 Xueyuan Road, Haidian District, Beijing). The geographic location object can be used to indicate a building, a restaurant, a hotel, a bank, a public transit station, a hospital, or other object having a distance from the current geographic location information within a preset distance range.

In some embodiments, the preset rule includes: a contact-related rule, in which the expansion content corresponding to the target candidate includes: at least one piece of contact directory information corresponding to the target candidate.

In some embodiments, the preset rules correspond to preset intention types. The preset intention types can include: time-type intentions, date-type intentions, terminal identifier-type intentions, geographic location-type intentions, contact-type intentions, or any combination thereof. For example, a preset intention type can be used to indicate an intention type associated with the candidate content or the intention type associated with the candidate content and context. For example, the candidate content corresponds to an entry selected from a dictionary, and the context corresponds to the current time.

In some embodiments, intention-type contents corresponding to various preset intention types can be collected in advance to obtain intention-type content that conforms to a preset rule. For example, the intention-type content corresponding to a time-type intention can include: "time," "today," "now," "at present," "current," "what time is it?," etc. The intention-type content corresponding to a date-type intention can include: "date," "today," "early part of the month," "at present," "current," "what date?," etc. The intention-type content corresponding to a terminal identifier-type intention can include: "International Mobile Equipment Identity (IMEI) number," "equipment identification code," "equipment number," "equipment identity number," etc. The intention-type content corresponding to a geographic location-type intention can include: "location," "I am at," "I am now," etc. The intention-type content corresponding to a contact-type intention can include: names of contacts in a contact directory, etc.

In some embodiments, a target candidate is determined that conforms to the preset rule as follows: the candidate corresponding to the current input string is matched with intention-type content conforming to a preset rule; in the event that the candidate corresponding to the current input string matches the intention-type content conforming to the preset rule, then the candidate corresponding to the current input string is determined to be a target candidate conforming to the preset rule. Assuming that the current input string is "wozai." The Chinese character string candidates corresponding to the current input string (specifically, Chinese character strings whose pronunciations match the input pingyin string of "wozai") can include: "I am at," "I again," "gripping at," "nest at," "lying by," etc. Thus, these candidates can be matched with intention-type content that conforms to a preset rule. For example, the matching result for "I am at" is a "successful match," and the matching result for "I again," "gripping at," "nest at," "lying by," etc. is a "failed match" because "I again," "gripping at," "nest at," "lying by," etc. does not have not any connection with the input pinyin string of "wozai." Therefore, the current input string "I am at" can be regarded as the target candidate. In other words, increasing the efficiency of target candidate determination through the process of matching to determine the target candidate that conforms to a preset rule is possible. For example, after the matching item is found, an icon can be added to the candidate item, so the user can easily select the matching item.

Please note that the above matching operation is optional. In fact, persons skilled in the art may, as necessary for actual applications, employ other schemes for determining the target candidate that is in conformity with a preset rule. For example, one of ordinary skill can analyze the current intention types of the candidates based on semantics of the candidates corresponding to the current input string or based on semantics of the candidates corresponding to the current input string and the text above. As an example of semantics, when the user provides the input string "what time it is?," the user probably wants to insert the current time. If the current intention type is consistent with or corresponds to a preset intention type, then a determination can be made that the candidate is the target candidate that conforms to a preset rule. There are no restrictions relating to the determination of target candidates that conform to the preset rule.

In an example, to make easier the recognizing of the target candidate, before the receiving of the first trigger instruction from the user directed at the target candidate that conforms to a preset rule, the process 100 can further include: during the presenting of the candidates, the client presents marked target candidates that conform to a preset rule.

In another example, the presenting of the marked target candidates that conform to the preset rule can include at least one of the following:

Operation A1: By marking a font or color of the target candidate, the client presents a marked target candidate that conforms to a preset rule. For example, the marked target candidate font is bolded, underlined, italicized, made three-dimensional, set as red, etc. The marking of the target candidate can increase the recognition level of the target candidates relative to ordinary candidates with normal fonts and/or normal colors.

Operation A2: While presenting the marked target candidate conforming to the preset rule, the client presents identifiers for the marked target candidate.

In some embodiments, the identifier for the marked target candidate can be matched with a preset intention type corresponding to the identifier for the marked target candidate. For example, when the preset intention type that corresponds to the identifier for the marked target candidate is a time-type intention, the identifier for the marked target candidate can be represented using a clock icon or a timer icon. In another example, when the preset intention type that corresponds to the identifier for the marked target candidate is a date-type intention, the identifier for the marked target candidate can be represented using a day calendar icon or a month calendar icon. In yet another example, when the preset intention type that corresponds to the identifier for the marked target candidate is a terminal identifier-type intention, the identifier for the marked target candidate can be represented using a system icon. In yet another example, when the preset intention type that corresponds to the identifier for the marked target candidate is a geographic location-type intention, the identifier for the marked target candidate can be represented using a positioning identifier (e.g., a special icon). In yet another example, when the preset intention type that corresponds to the identifier for the marked target candidate is a contact-type intention, the identifier for the marked target candidate can be represented using a contact icon. There are no restrictions relating to the matching of particular identifiers with preset intention types. In addition, the identifier for the marked target candidate can be placed in a superscript or other position around or near the target candidate. There are no restrictions as to the particular position of the identifier.

In various embodiments, the providing, to the user, of the expansion content corresponding to the target candidate includes one of the following:

Operation B1: In response to the first trigger instruction, present the expansion content corresponding to the target candidate.

Operation B2: In response to the first trigger instruction, present a first access entrance to the expansion content corresponding to the target candidate, and present corresponding expansion content based on a second trigger instruction from the user directed at the first access entrance. As an example, the first access entrance corresponds to an icon conforming to a preset rule located at the top-right corner of a candidate.

In some embodiments, operation B1 directly presents the expansion content corresponding to the target candidate. For example, operation B1 directly presents current time information corresponding to the target candidate "time." In another example, operation B1 directly presents current date information corresponding to the target candidate "date." In yet another example, operation B1 directly presents current terminal identifier information corresponding to the target candidate "IMEI." In yet another example, operation B1 directly presents current geographic location information corresponding to the target candidate "I am at," at least one geographic location object corresponding to the current geographic location information, or a combination thereof. In yet another example, operation B1 directly presents at least one piece of contact directory information corresponding to the target candidate "Tuntun." "Tuntun" can refer to a person's name.

Operation B2 can first provide a first access entrance to the expansion content corresponding to the target candidate, and then present corresponding expansion content based on a second trigger instruction from the user directed at the first access entrance. Using the target candidate "I am at" as an example, then in response to a first trigger instruction, the target candidate can be placed at the top of the screen and a positioning identifier can be presented. Subsequently, in response to a second trigger instruction from the user for the positioning identifier, the current geographic location information corresponding to the target candidate, the geographic location object corresponding to the current geographic location information, or a combination thereof can be placed at the top of the screen, or the current geographic location information corresponding to the target candidate, at least one geographic location object corresponding to the current geographic location information, or a combination thereof can be presented.

One skilled in the art can perform either of operations B1 and B2. There are no restrictions imposed on the specific way in which the expansion content corresponding to the target candidate is provided to the user.

In various embodiments, the expansion content is acquired from an app other than the input program using one of the following options:

Operation C1: Determine a corresponding target app based on the preset intention type corresponding to the preset rule.

Operation C2: By invoking an application programming interface (API) provided by the target app, acquire, from the target app, the expansion content corresponding to the target candidate.

For example, when the preset intention type is a time-type intention, the target app corresponding to the time-type intention can be a system app, a browser app, or another app configured to provide clock information. In another example, when the preset intention type is a date-type intention, the target app corresponding to the date-type intention can be a calendar app, a browser app, or another app configured to provide date information. In yet another example, when the preset intention type is a terminal identifier-type intention, the target app corresponding to the terminal identifier-type intention can be a system app or another app configured to provide equipment information. In yet another example, when the preset intention type is a geographic location-type intention, the target app corresponding to the geographic location-type intention can be a map app, a browser app, or another app configured to provide geographic location information and/or geographic location object information. In yet another example, when the preset intention type is a contact-type intention, the target app corresponding to the contact-type intention can be a contact directory app or another app configured to provide contact directory information.

In an application example, a map app provides a Software Development Kit (SDK). The SDK can include an API for implementing a specific function. For example, the specific function includes looking up geographic location objects around the current location. Thus, when the preset intention type is a geographic location-type intention, the input program can acquire geographic location objects from the map app by invoking the API used to look up geographic location objects around the current location.

In some embodiments, the process 100 further includes: in response to a selection instruction from the user for the expansion content, the expansion content corresponding to the selection instruction is placed at the top of the screen. The above screen display operation can output the corresponding expansion content into the current app (first app). Since process 100 allows the user to rapidly input expansion content corresponding to the target candidate without switching apps or switching interfaces, process 100 can greatly increase user input efficiency.

In some embodiments, the input interface for the first trigger instruction, the second trigger instruction, selection trigger instructions, and other user instructions are flexibly set up to facilitate triggering operations from the user. Using the first trigger instruction as an example, an input interface of the first trigger instruction can be set at a position near the target candidate, or the input interface of the first trigger instruction can be the space bar, a number key, or some other preconfigured shortcut key. There are no restrictions on the input interface for the user instruction. In addition, the specific ways in which the first trigger instruction is triggered can include: clicking, double-clicking, dragging, pinching, or any combination thereof. There are no restrictions as to the specific ways in which a trigger instruction or a selection instruction is triggered.

In addition, when the target candidate is put at the top of the screen, performing operation 140 is possible. In other words, after receiving the first trigger instruction, putting the target candidate at the top of the screen and providing, to the user, expansion content corresponding to the target candidate are possible. In such a situation, after receiving a selection instruction from the user for the expansion content, putting the expansion content corresponding to the selection instruction at the top of the screen following the target candidate is possible. When the target candidate is not put at the top of the screen, performing operation 140 is also possible. In such a situation, after receiving a selection instruction from the user for the expansion content, putting the target candidate and the expansion content corresponding to the selection instruction simultaneously at the top of the screen is possible.

In addition, when the first character of the expansion content corresponding to the selection instruction is a numeral, a letter, or a Chinese character, a normal space can be automatically added in front of the expansion content corresponding to the screen display. The automatic adding of the normal space can prevent the problem of different content getting mixed together and becoming difficult to differentiate. Thus, increasing the level of differentiation between expansion content that is to be put at the top of the screen and content that is already at the top of the screen (such as the target candidate or expansion content) is possible.

In summary, in response to receiving a first trigger instruction from the user directed to a target candidate, the input program, which contains the expansion content, can provide expansion content that corresponds to the target candidate and that was acquired from an app other than an input program. Since process 100 can provide the user with expansion content other than dictionary information without having to switch between apps or interfaces to allow the user to quickly input the expansion content, process 100, in relation to conventional processes, simplifies the input process for providing expansion content originating from apps other than the input program and thus increases user input efficiency.

Figure 2:
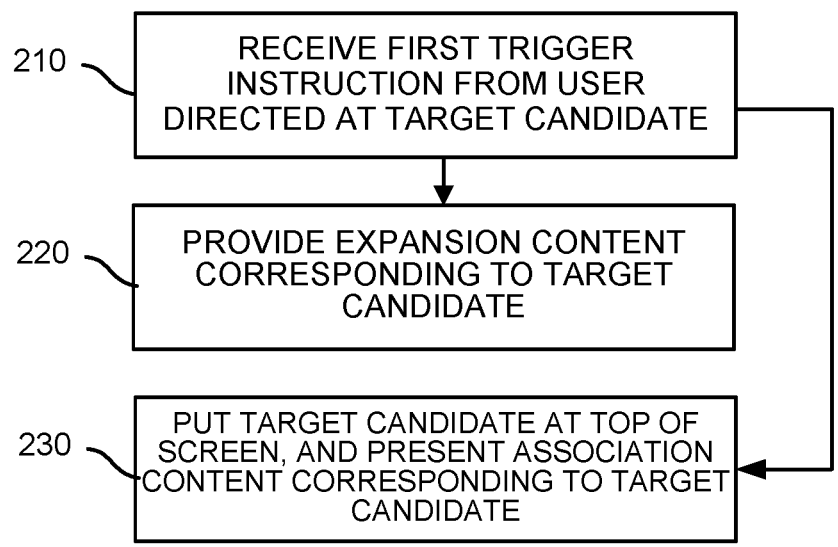
FIG. 2 is a flowchart of another embodiment of a process for inputting information.

FIG. 2 is a flowchart of another embodiment of a process for inputting information. In some embodiments, the process 200 is implemented by a client or smart terminal 1600 of FIG. 16 and comprises:

In operation 210, the client receives a first trigger instruction from a user directed at a target candidate that conforms to a preset rule.

In operation 220, in response to the first trigger instruction, the client provides, to the user, expansion content corresponding to the target candidate. In some embodiments, the expansion content is content acquired from an app other than the input program.

In operation 230, in response to the first trigger instruction, the client puts the target candidate at the top of the screen, and while presenting the expansion content corresponding to the target candidate or a first access entrance for the expansion content, presents association content corresponding to the target candidate.

Relative to process 100 of FIG. 1, process 200 can further, in response to the first trigger instruction, put the target candidate at the top of the screen, and while presenting the expansion content corresponding to the target candidate or the first access entrance for the expansion content, present association content corresponding to the target candidate. The association content can be used to indicate content that might continue to be input following the target candidate. For example, the association content can be obtained by the input program based on a word combination algorithm or automatic word/phrase calculations. In another example, the association content can be obtained by an input program based on pre-established correspondences between target candidates and association content, or generated by the current input context.

In an example, assume that the target candidate is "time." In this case, the obtained corresponding association content includes "go," "well," etc. There are no restrictions placed on particular association content and the manner in which the association content is acquired.

Please note that the expansion content and the association content can be presented in different ways to more effectively differentiate between the two contents. For example, different fonts, font colors, or zone colors can be used to differentiate between the two contents. There are no restrictions as to the specific manner of presenting the two contents.

In summary, process 200 not only can present expansion content (or a first access entrance to expansion content) acquired from an app other than the input program, but process 200 can also present association content provided by the input program. Therefore, process 200 can enrich content that conforms with subsequent input intentions.

Figure 3A:
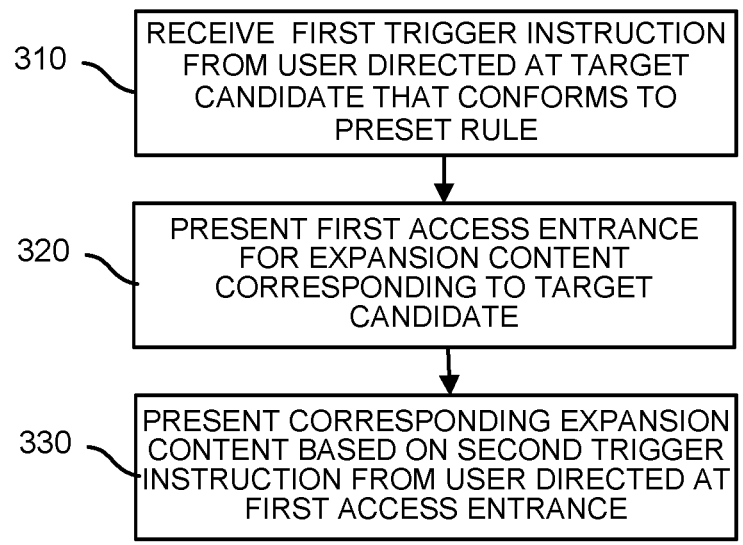
FIG. 3A is a flowchart of yet another embodiment of a process for inputting information.

FIG. 3A is a flowchart of yet another embodiment of a process for inputting information. The process 300 is an optional embodiment of process 100 of FIG. 1. The following builds on process 100 of FIG. 1 and is a concrete explanation of the information input process of process 100 based on a geographic location-related rule. In some embodiments, process 300 is implemented by a client or smart terminal 1600 of FIG. 16 and comprises:

In 310, the client receives a first trigger instruction from a user directed at a target candidate that conforms to a preset rule. As an example of the first trigger instruction, the user can input the input string "locate me." In some embodiments, the preset rule includes a geographic location-related rule. As an example of a geographic location-related rule, when the user inputs the input string "locate," the geographic location-related rule generates a location candidate by using a map software development kit (SDK), then displays the location candidate. [

In 320, in response to the first trigger instruction, the client presents to the user a first access entrance (e.g., a user interface widget) for expansion content corresponding to the target candidate. In some embodiments, the expansion content is content acquired from an app other than the input program.

In 330, the client presents corresponding expansion content based on a second trigger instruction from the user directed at the first access entrance. As an example of the second trigger instruction, upon inputting a person's name, the client shows a special candidate, which means the user can input more information upon the selection of the special candidate.

In some embodiments, operation 320 includes: displaying the target candidate at the top of a screen, and presenting a positioning identifier.

In some embodiments, operation 330 includes: in response to a second trigger instruction from the user for the positioning identifier, displaying the current geographic location information corresponding to the target candidate, a geographic location object corresponding to the current geographic location information, or a combination thereof at the top of the screen; or presenting the current geographic location information corresponding to the target candidate, at least one geographic location object corresponding to the current geographic location information, or a combination thereof. Displaying at the top of screen means the displaying is to hide all other things. On the other hand, the presenting of the current geographic location information in a small area in the input program will not interrupt the input.

Figure 3B:
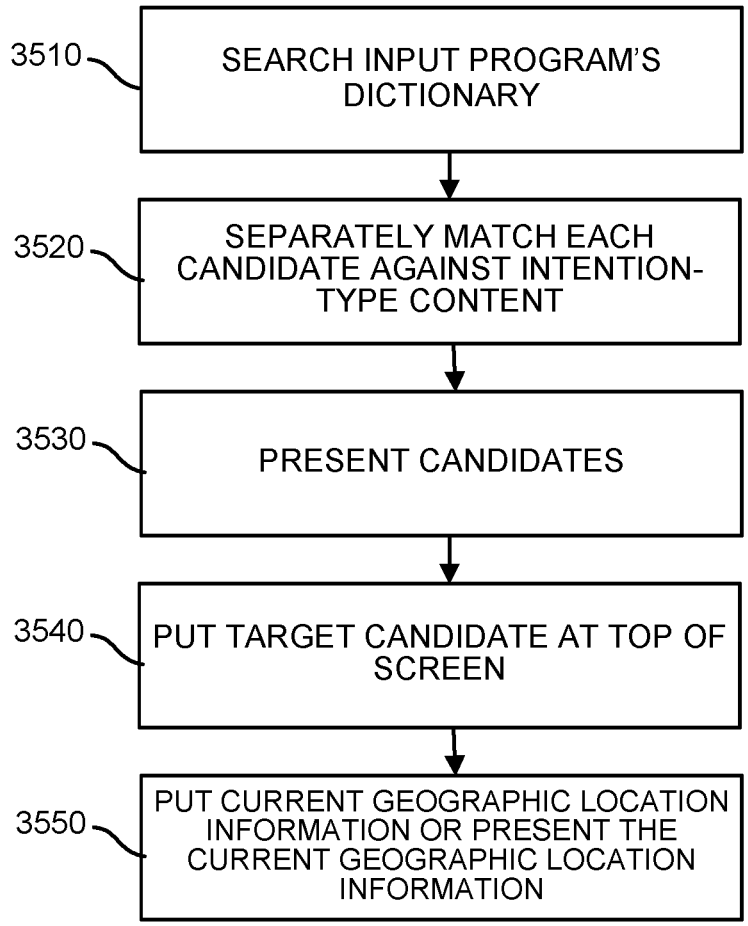
FIG. 3B is a flowchart of an embodiment of a process for inputting information based on a geographic location-related rule.

FIG. 3B is a flowchart of an embodiment of a process for inputting information based on a geographic location-related rule. In some embodiments, process 3500 is implemented by a client or smart terminal 1600 of FIG. 16 and comprises:

An example of a process for inputting information based on a geographic location-related rule is presented here using the particular input string "wozai."

In 3510, the client searches an input program's dictionary and obtains multiple corresponding candidates based on an input string "wozai," such as "I am at," "I again," "gripping at," "nest at," "lying by," etc.

In 3520, the client separately matches each candidate corresponding to the input string "wozai" against intention-type content that conforms to a geographic location-related rule to obtain a target candidate "I am at," which successfully matches and conforms to the preset geographic location-related rule. As an example of intention-type content, intention-type content has a strong connection with a location, such as, for example, "I am at" or "where will I go."

In 3530, the client presents the candidates corresponding to the input string "wozai." While presenting the target candidate "I am at," the client displays a positioning identifier to the right and above "I am at."

In 3540, in response to the first trigger instruction from the user for the target candidate "I am at," the client puts the target candidate "I am at" at the top of the screen, and presents the positioning identifier.

In 3550, in response to a second trigger instruction from the user for the positioning identifier, the client puts the current geographic location information corresponding to the target candidate "I am at," the geographic location object corresponding to the current geographic location information, or a combination thereof at the top of the screen or presents the current geographic location information corresponding to the target candidate "I am at," at least one geographic location object corresponding to the current geographic location information, or a combination thereof.

Figure 4:
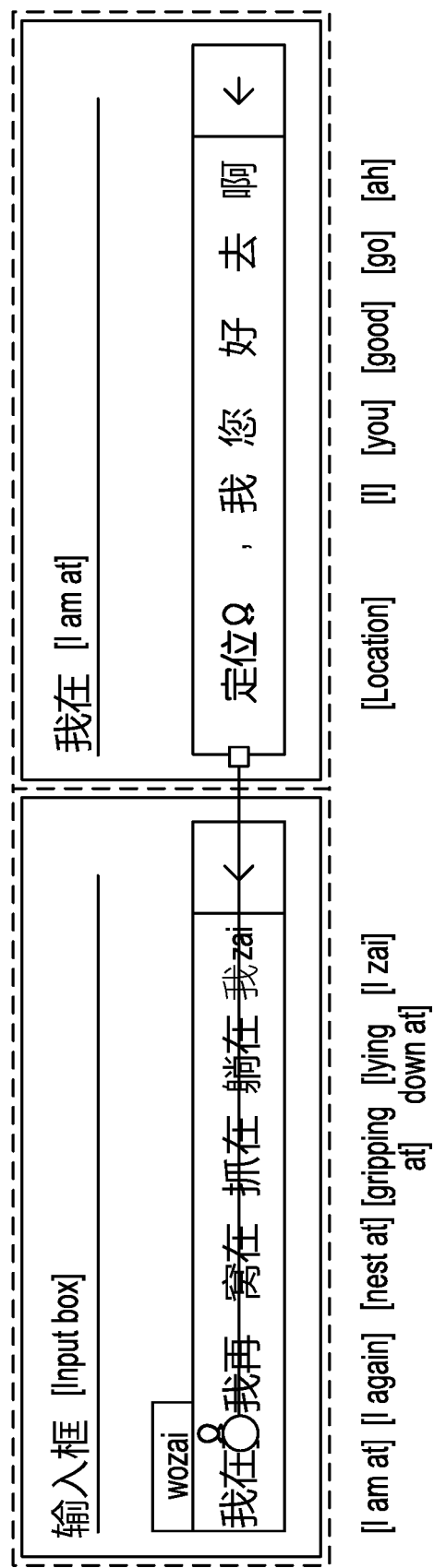
FIG. 4 is a diagram of an example of a presentation interface.

FIG. 4 is a diagram of an example of a presentation interface. In the diagram, the target candidate "I am at" is presented on the far left side of the candidate area, and a positioning identifier corresponding to a geographic location-type intention is displayed above and to the right of "I am at." After a first triggering instruction from the user directed at the target candidate "I am at" is received, the target candidate "I am at" can be put at the top of the screen, and the positioning identifier can be presented. At the same time, the association content for the target candidate "I am at" can also be presented, including "I," "you," "good," "go," "ah," etc.

Figure 5:
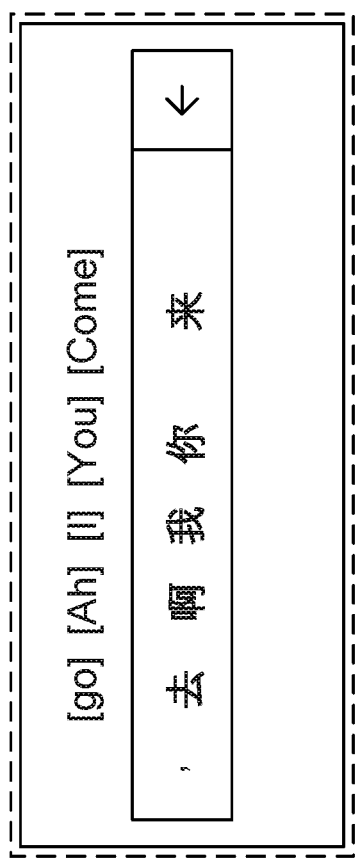
FIG. 5 is a diagram of another example of a presentation interface.

In another example, in the event that the current geographic location information corresponding to the target candidate includes one piece of geographic location information, or in the event that the current geographic location object corresponding to the current geographic location information includes one geographic location object, in other words, if the target candidate corresponds to one piece of expansion content, then in response to a second trigger instruction from the user for the positioning identifier, one piece of geographic location information or the geographic location object can be put at the top of the screen to increase input efficiency for the expansion content. FIG. 5 is a diagram of another example of a presentation interface. For example, after receiving a trigger instruction from the user directed at the positioning identifier in FIG. 4, the system jumps to the presentation interface of FIG. 5. This presentation interface can put a piece of geographic location information (No. 1 Auxiliary Road to East 3rd Ring Road Middle, Hujialou Subdistrict, Chaoyang District, Beijing) at the top of the screen after the target candidate "I am at" and present, in the target candidate area, association content for "No. 1 Auxiliary Road to East 3rd Ring Road Middle, Hujialou Subdistrict, Chaoyang District, Beijing": ",", "go," "Ah," "I," "You," "Come," etc.

In yet another example, in the event that the current geographic location information corresponding to the target candidate includes more than one piece of geographic location information, or in the event that the current geographic location objects corresponding to the current geographic location information include more than one geographic location object, or the target candidate simultaneously corresponds to at least one piece of geographic location information and at least one geographical location object; in other words, in the event that the target candidate corresponds to more than one piece of expansion content, then in response to the second trigger instruction from the user for the positioning identifier, the user can be presented with more than one piece of expansion content to choose from; and in response to the user's selection instruction for the expansion content, expansion content corresponding to the selection instruction can be put at the top of the screen.

The present embodiment is an optional embodiment of process 100 of FIG. 1. The following builds on process 100 and is a concrete explanation of its information input method based on a contact-related rule.

Figure 6A:
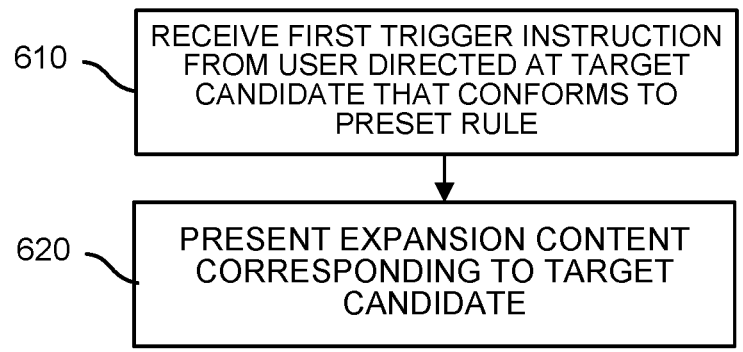
FIG. 6A is a flowchart of yet another embodiment of a process for inputting information.

FIG. 6A is a flowchart of yet another embodiment of a process for inputting information. Process 600 is an embodiment of process 100 of FIG. 1. The following builds on process 100 and is a concrete explanation of its information input process based on a contact-related rule. In some embodiments, process 600 is implemented by a client or smart terminal 1600 of FIG. 16 and comprises:

At 610, the client receives a first trigger instruction from a user directed at a target candidate that conforms to a preset rule. In some embodiments, the preset rule includes a contact-related rule.

At 620, in response to the first trigger instruction, the client presents to the user expansion content corresponding to the target candidate. In some embodiments, the expansion content corresponds to content acquired from an app other than the input program. As an example, expansion content stored in the Contacts app can be acquired using Contacts API. The expansion content corresponding to the target candidate includes: at least one piece of contact directory information corresponding to the target candidate.

Figure 6B:
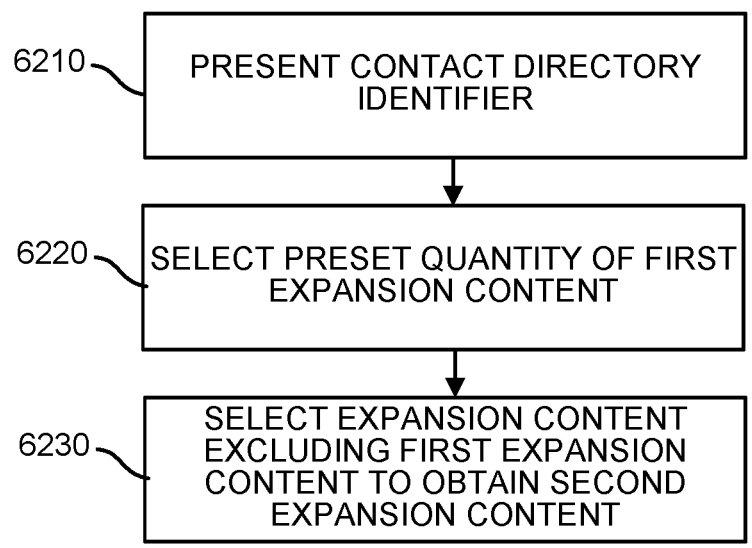
FIG. 6B is a flowchart of an embodiment of a process for presenting expansion content.

FIG. 6B is a flowchart of an embodiment of a process for presenting expansion content. In some embodiments, process 6200 is an implementation of operation 620 of FIG. 6A and comprises:

In 6210, in response to the first trigger instruction, the client presents a contact directory identifier. For example, the contact directory identifier is listing of contacts.

In 6220, in response to a second trigger instruction from the user for the contact directory identifier, the client selects, from the expansion content corresponding to the target candidate, a preset quantity of first expansion content, and presents the quantity of first expansion content.

In 6230, in response to a user swipe instruction, the client selects, from the expansion content corresponding to the target candidate, the expansion content excluding the first expansion content to obtain second expansion content, and presents the second expansion content.

Figure 6C:
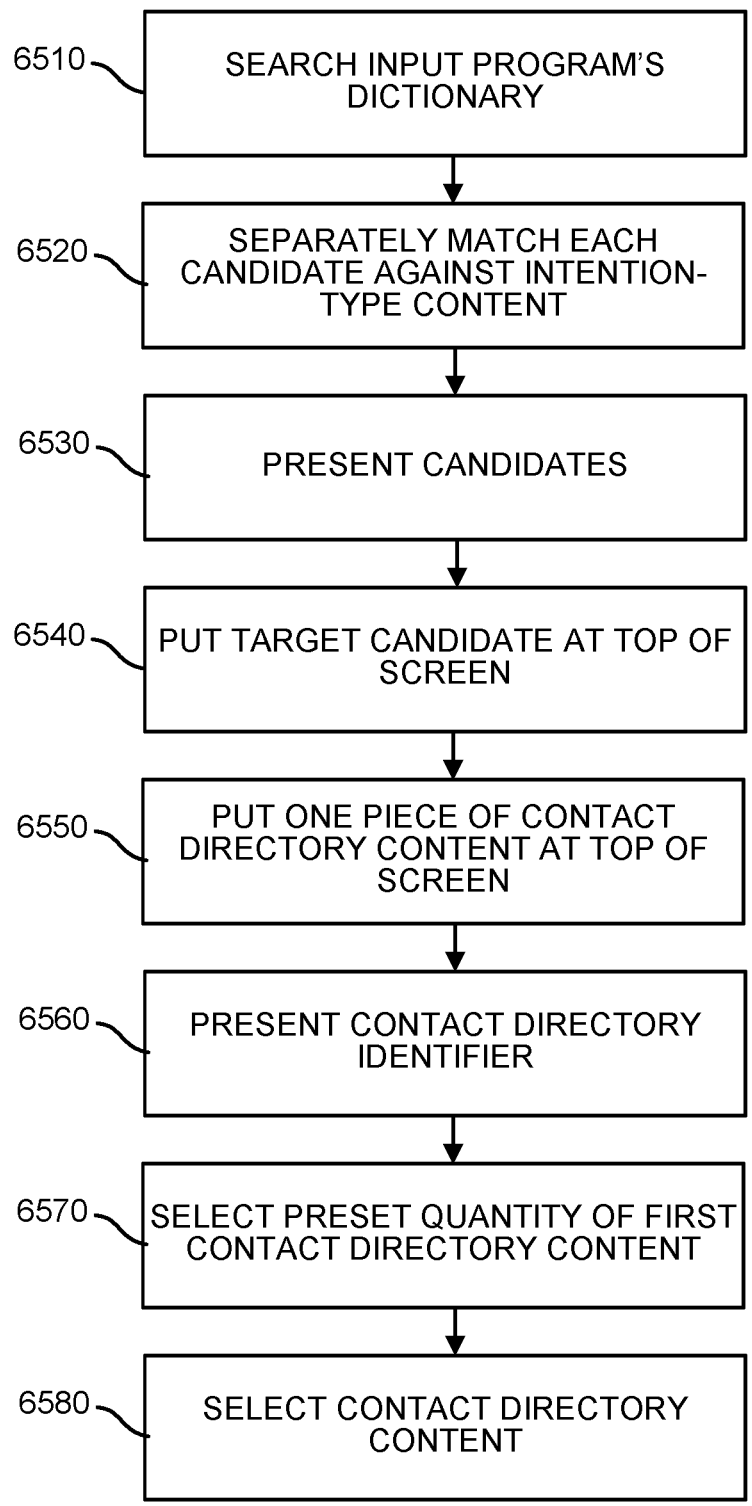
FIG. 6C is a flowchart of an embodiment of a process of inputting information based on a contact-related rule.

FIG. 6C is a flowchart of an embodiment of a process of inputting information based on a contact-related rule. In some embodiments, process 6500 is implemented by a client or smart terminal 1600 of FIG. 16 and comprises:

An example of a process of inputting information based on a contact-related rule is presented here using a particular input string "tuntun."

In 6510, search the input program's dictionary and obtain multiple corresponding candidates based on the input string "tuntun."

In 6520, separately match each candidate corresponding to the input string "tuntun" against intention-type content that conforms to a preset contact-related rule to obtain a target candidate "豚豚 [tuntun]," which successfully matches and conforms to the preset contact-related rule. As an example of the preset contact-related rule, the input program created a mapping rule based on data in the Contacts app.

In 6530, present the candidates corresponding to the input string "tuntun." While presenting the target candidate "豚豚 [tuntun]," display a contact icon to the right and above "豚豚 [tuntun]."

In 6540, in response to a first trigger instruction from the user for the target candidate "豚豚 [tuntun]," put the target candidate "豚豚 [tuntun]" at the top of the screen, and present at least one piece of contact directory content corresponding to "豚豚 [tuntun]."

In 6550, in the event that one piece of contact directory content corresponding to "豚豚 [tuntun]" exists, put the one piece of contact directory content at the top of the screen in response to the first trigger instruction.

In 6560, in the event that more than one piece of contact directory content corresponding to "豚豚 [tuntun]" exists, present the contact directory identifier in response to the first trigger instruction.

In 6570, in response to a second trigger instruction from the user for the contact directory identifier, select, from the contact directory content corresponding to "豚豚 [tuntun]," a preset quantity of first contact directory content, and present the preset quantity of first contact directory content.

In 6580, in response to a user swipe instruction, select, from the contact directory content corresponding to "豚豚 [tuntun]," the contact directory content excluding the first contact directory content to obtain second contact directory content, and present the second contact directory content.

Figure 7:
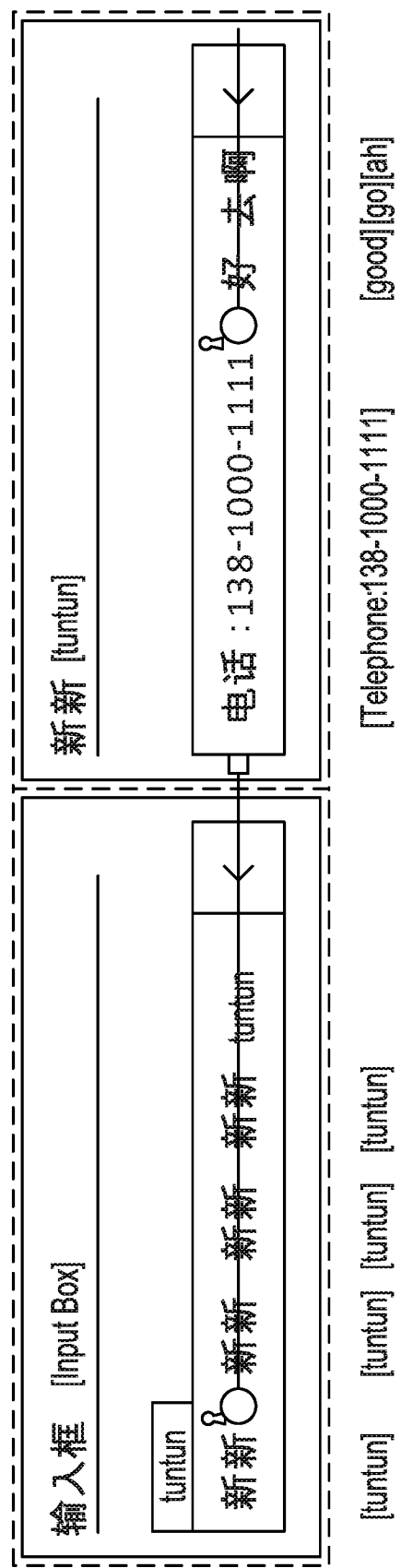
FIG. 7 is a diagram of yet another example of a presentation interface.

FIG. 7 is a diagram of yet another example of a presentation interface. In FIG. 7, the target candidates for pingyin "tuntun" are presented on the far left side of the candidate area. Moreover, a contact icon corresponding to a contact-type intention is displayed above and to the right of the target candidate "豚豚 [tuntun]." After a first triggering instruction, e.g., clicking on the target candidate, from the user directed at the target candidate "豚豚 [tuntun]" is received, the target candidate "豚豚 [tuntun]" can be put at the top of the screen, and the contact directory content "Telephone: 138-1000-1111" is presented. At the same time, association content for the target candidate "豚豚 [tuntun]" is also presented: "good," "go," "ah," etc. In this way, upon receiving the selection instruction from the user (e.g., clicking on, tapping, or selecting the entry) related to "Telephone: 138-1000-1111," the system can put the contact directory content "Telephone: 138-1000-1111" at the top of the screen after "豚豚 [tuntun]."

Figure 8:
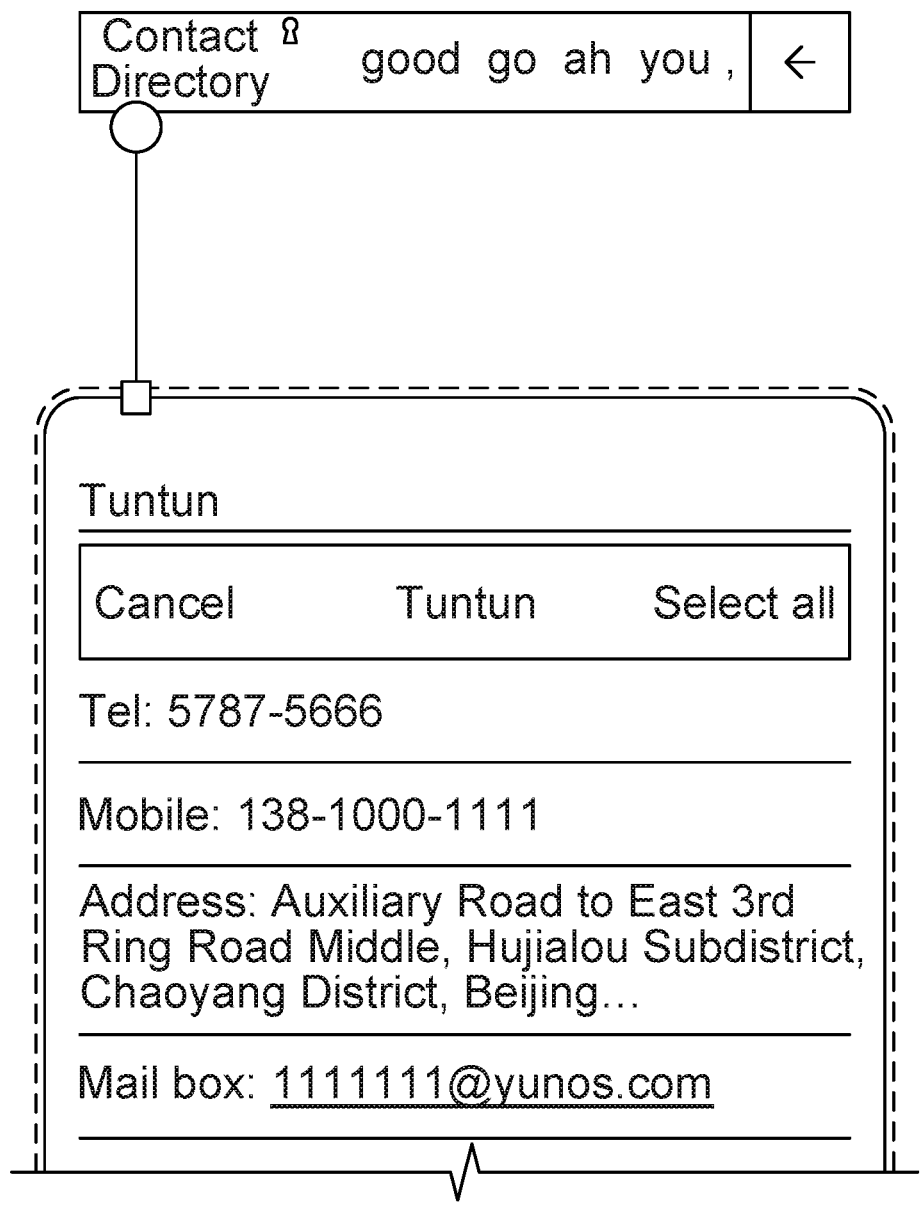
FIG. 8 is a diagram of yet another example of a presentation interface.

FIG. 8 is a diagram of yet another example of a presentation interface. After a first triggering instruction from the user directed at the target candidate "豚豚 [tuntun]" is received, the target candidate "豚豚 [tuntun]" can be put at the top of the screen, and the contact directory identifier is presented. At the same time, association content for the target candidate "豚豚 [tuntun]" is also presented: "good," "go," "ah," etc. Moreover, after receiving the user's second trigger instruction directed at the contact directory identifier, the system presents the first three pieces of contact directory content (in an order arranged by the contact directory program) from the contact directory content corresponding to "豚豚 [tuntun]." After receiving a user swipe instruction on the screen, the system selects, from the contact directory content corresponding to "豚豚 [tuntun]," the contact directory content excluding the first three pieces of contact directory content to obtain remaining contact directory content, and presents the remaining contact directory content. For example, the contact directory content is created by the Contacts app and contains information such as name, telephone number, etc. Let us assume that the number of pieces of contact directory content is N. If N is less than or equal to 6, then after the first swipe instruction is received, the next N-3 pieces of contact directory content can be presented for selection. If N is greater than 6, then after a second swipe instruction is received, the pieces of contact directory content starting at the 7th piece can be presented for selection.

Figure 9:
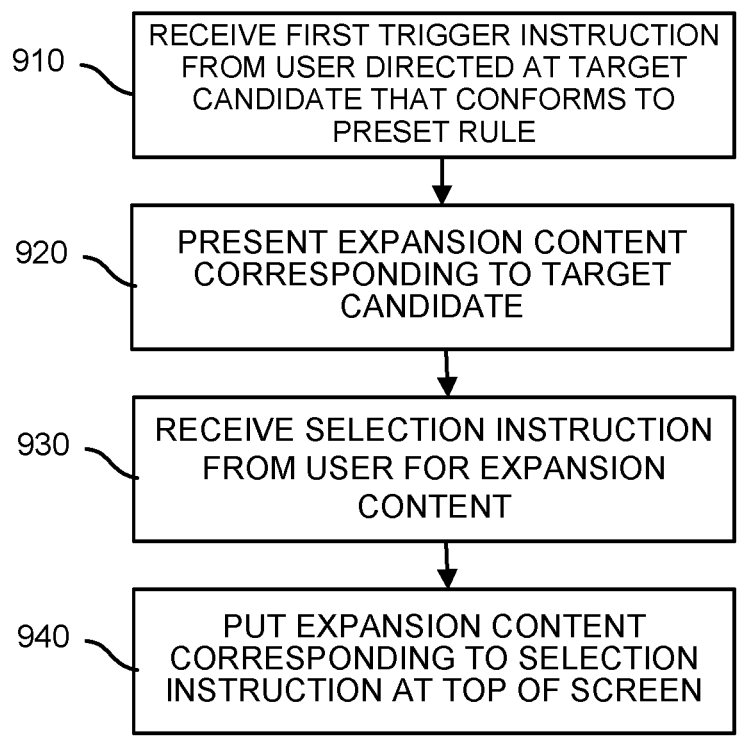
FIG. 9 is a flowchart of yet another embodiment of a process for inputting information.

FIG. 9 is a flowchart of yet another embodiment of a process for inputting information. Process 900 is an embodiment of process 100 of FIG. 1. Process 900 builds on process 100 of FIG. 1 and is a concrete example of its information input based on a contact-related rule. In some embodiments, the process 900 is implemented by a client or smart terminal 1600 of FIG. 16 and comprises:

In 910, the client receives a first trigger instruction from a user directed at a target candidate that conforms to a preset rule. In this example, the preset rule includes a contact-related rule.

In 920, in response to the first trigger instruction, the client presents, to the user, expansion content corresponding to the target candidate. In this example, the expansion content is content acquired from an app other than the input program. For example, the expansion content is acquired using APIs provided by an app such as the Contact app. The expansion content corresponding to the target candidate can include at least one piece of contact directory information corresponding to the target candidate.

In 930, the client receives a selection instruction from the user for the expansion content.

In 940, in response to the selection instruction from the user for the expansion content, the client puts the expansion content corresponding to the selection instruction at the top of the screen.

The receiving of the selection instruction from the user for the expansion content can include one of the following three options:

In the same interface, the interface presents the single choice and the select-all choice.

First option, upon presenting the at least one piece of contact directory information, the client presents a select-all control corresponding to the at least one piece of contact directory information, and in response to receiving a trigger instruction from the user for the select-all control, the client obtains a selection instruction from the user for all the contact directory information.

Second option, in response to a trigger instruction from the user for a single piece of contact directory information, the client obtains a selection instruction from the user for the single piece of contact directory information.

Third option, in response to a trigger instruction from the user for a single piece of contact directory information, the client presents a color-modified display of the single piece of contact directory information; in response to receiving a trigger instruction from the user for a single piece of contact directory information presented in modified colors, the client obtains a selection instruction from the user for the single piece of contact directory information presented in modified colors.

In contrast to process 100 of FIG. 1, process 900 can support both the selection of all contact directory information and the selection of single pieces of contact directory information one at a time. In the case of single pieces of contact directory information that have already received a triggering instruction, the client can present the single pieces of contact directory information in modified colors. Moreover, after receiving the user's triggering instruction for a single piece of contact directory information presented in modified colors, the client can still keep the selection of the single piece of contact directory information in effect.

FIG. 10 is a diagram of yet another example of a presentation interface. The presentation interface includes a "select-all" control to implement a selection instruction from the user of all the contact directory information. Moreover, after receiving the user's trigger instruction for single pieces of contact directory information, the system can separately and sequentially put the single pieces of contact directory information "Telephone no.: 5787-5666" and "e-mail address: 1111111@yunos.com" at the top of the screen. Moreover, the single pieces of contact directory information that have already received a triggering instruction can be presented in modified colors (e.g., the modified colors can be lightened). In the event that another triggering instruction directed at a single piece of contact directory information presented in modified colors is received, the selection of the single piece of contact directory information remains in effect. In other words, the corresponding content at the top of the screen can remain unchanged.

Figure 11:
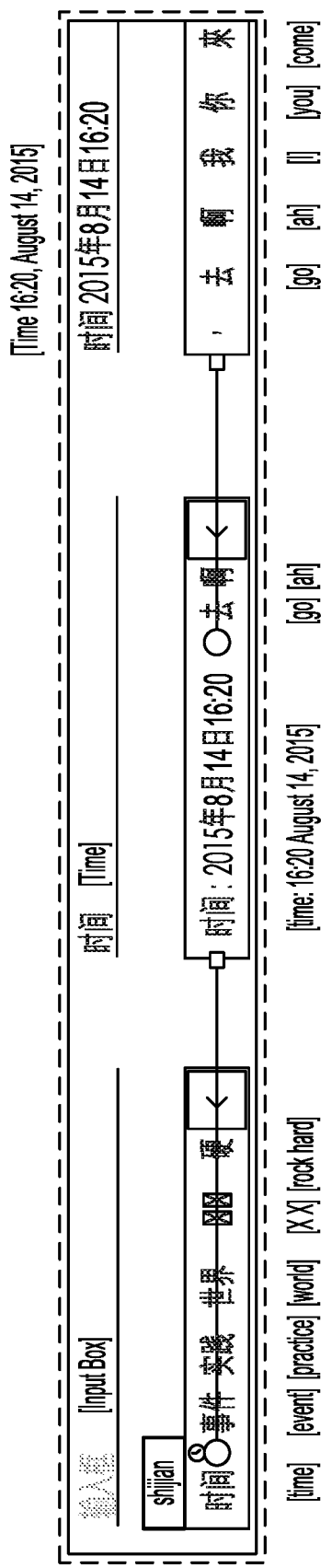
FIG. 11 is a diagram of yet another example of a presentation interface.

FIG. 11 is a diagram of yet another example of a presentation interface. The presentation interface is an embodiment of process 100 of FIG. 1. The following builds on process 100 and is an example of an information input method of the presentation interface based on a time, date, or terminal identifier-related rule. In some embodiments, the target candidate "time" is presented on the far left side of the candidate area. Moreover, a clock icon corresponding to a time-type intention can be displayed above and to the right of "time." After receiving a first triggering instruction from the user directed at the target candidate "time," the target candidate "time" can be put at the top of the screen, and the expansion content "time: 16:20 Aug. 14, 2015" is presented. At the same time, the association content for the target candidate "time" is also presented: "go," "ah," etc. In this way, upon receiving the selection instruction from the user directed at "time: 16:20 Aug. 14, 2015," the system, after putting the expansion content "time: 16:20 Aug. 14, 2015" at the top of the screen after "time," can further present the association content: ",", "go," "ah," "I," "you," "come," etc.

Figure 12:
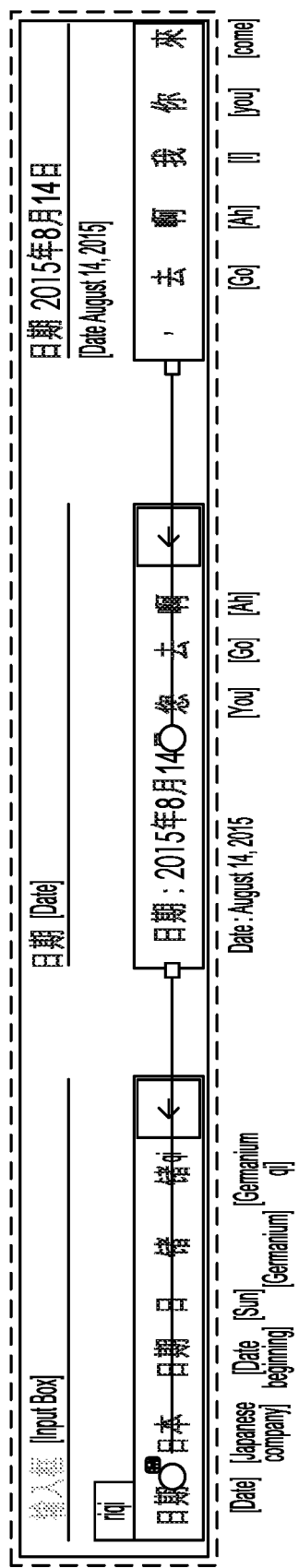
FIG. 12 is a diagram of yet another example of a presentation interface.

FIG. 12 is a diagram of yet another example of a presentation interface. In some embodiments, the target candidate "Date" is presented on the far left side of the candidate area. Moreover, a calendar icon corresponding to a date-type intention is displayed above and to the right of "Date." After receiving a first triggering instruction from the user directed at the target candidate "Date," the target candidate "Date" can be put at the top of the screen, and the expansion content "Date: Aug. 14, 2015" is presented. At the same time, association content for the target candidate "Date" is also presented: "You," "Go," "Ah," etc. In this way, upon receiving the selection instruction from the user directed at "Date: Aug. 14, 2015," the system, after putting the expansion content "Date: Aug. 14, 2015" at the top of the screen after "Date," can further present the association content: ",", "Go," "Ah," "I," "You," "come," etc.

Figure 13:
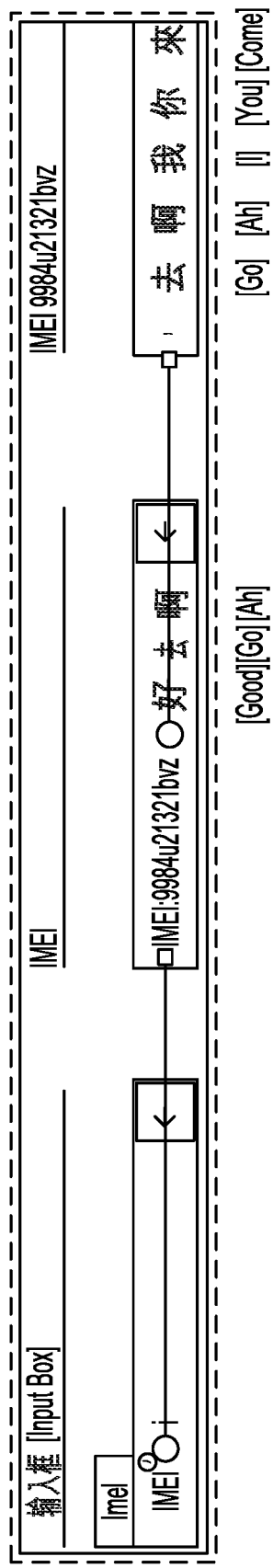
FIG. 13 is a diagram of yet another example of a presentation interface.

FIG. 13 is a diagram of yet another example of a presentation interface. In some embodiments, the target candidate "IMEI" is presented on the far left side of the candidate area. Moreover, a system icon corresponding to an IMEI-type intention is displayed above and to the right of "IMEI." After receiving a first triggering instruction from the user directed at the target candidate "IMEI," the target candidate "IMEI" can be put at the top of the screen, and the expansion content "IMEI: 9984u21321bvz" is presented. For example, the IMEI is acquired via an API provided by the operating system (OS). At the same time, association content for the target candidate "IMEI" is also presented: "Good," "Go," "Ah," etc. In this way, upon receiving the selection instruction from the user directed at "IMEI: 9984u21321bvz," the system, after putting the expansion content "IMEI 9984u21321bvz" at the top of the screen after "IMEI," can further present the association content: ",", "Go," "Ah," "I," "you," "come," etc.

Figure 14:
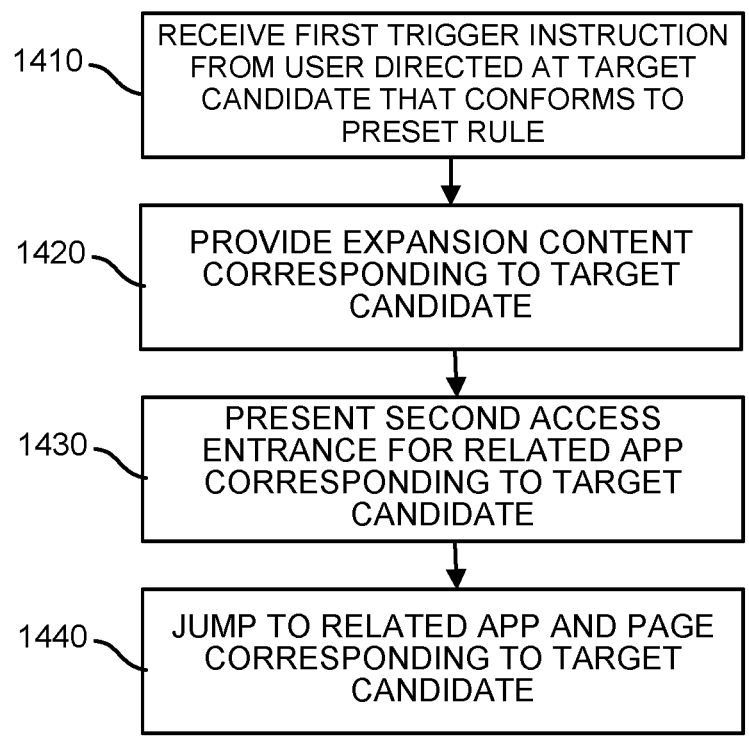
FIG. 14 is a flowchart of yet another embodiment of a process for inputting information.

FIG. 14 is a flowchart of yet another embodiment of a process for inputting information. In some embodiments, the process 1400 is implemented by a client or smart terminal 1600 of FIG. 16 and comprises:

In 1410, the client receives a first trigger instruction from a user directed at a target candidate that conforms to a preset rule.

In 1420, in response to the first trigger instruction, the client provides to the user expansion content corresponding to the target candidate. In some embodiments, the expansion content is content acquired from an app other than the input program.

In 1430, in response to the first trigger instruction, the client presents a second access entrance (e.g., a user interface widget) for a related app corresponding to the target candidate.

In 1440, in response to a third trigger instruction from the user for the second access entrance, the client jumps to the related app and a page corresponding to the target candidate.

In contrast to process 100 of FIG. 1, process 1400, in addition to being able to present expansion content corresponding to the target candidate, can present a second access entrance of a related app corresponding to the target candidate to jump from the current interface to the related app and a page corresponding to the target candidate.

As an example, the following operations can be performed to determine the target candidate that conforms to an Internet term-related rule: querying pre-established mapping relationships between input strings and Internet terms based on the current input string, and regarding Internet terms corresponding to the current input string as the target candidate conforming to the Internet term-related rule. The mapping relationships can be established via habit or from the current input context. Internet terms relate to popular words.

In some embodiments, the Internet terms could be terms in preset categories having a popularity that exceeds a popularity threshold value and that were collected in advance by a server. For example, the preset categories include film, television, music, celebrities, hot events, academics, etc. The server could store Internet terms, input strings, Internet term frequencies, and other such information within the mapping relationships. In this way, the current input string from a user in a first app can be matched against input strings in the mapping relationships. In the event that a match is successful, the corresponding target candidate can be obtained. In the event that multiple target candidates exist, the multiple target candidates can be ranked based on Internet term frequency.

In some embodiments, the target candidate corresponds to at least one related app. The input string can be related to a name of the related app, such as WeChat. For example, the related app is a search app. The search app can be an internal browser or standalone browser, such as the Chrome browser. Assume in this example that the target candidate is the singer "Liu Dehua." In that case, a jump could be made to "Liu Dehua's" search page in the search app. In another example, the related app is an encyclopedia app. Assume in this example that the target candidate is the flower name "thorn apple." In that case, a jump could be made to the "thorn apple" encyclopedia page. In yet another example, the related app is a map app. Assume in this example that the target candidate is the geographic location-related "I am at." In that case, a jump can be made to a map search page corresponding to the current location. In yet another example, the related app is a browser app. Assume in this example that the target candidate is a keyword relating to a hot event. In that case, a jump can be made to a web page for a hot event corresponding to the keyword. As an example, the jump can be made to the web page for the hot event via an API provided by the operating system.

Please note that after the user shuts the search page, the encyclopedia page, or the map search page, the system can return to the input program and put the corresponding target candidate or the content corresponding to the target candidate on the page (e.g., the names of restaurants near the current location provided by the map app) at the top of the screen.

In some embodiments, the technique where the client acquires Internet terms from a server can include:

In operation S1, the client, at preset times, accesses the Internet in a wireless fidelity (Wi-Fi) environment and uploads a previous update time and a user ID to the server.

In operation S2, the server detects whether new Internet term content exists based on the previous update time and user ID uploaded by the client. As an example, to perform the detection, the client compares the data version from the server with the new Internet term content via the Internet.

In operation S3, in the event that no new Internet term content exists, the server does not return content and issues, to the client, a time for the next server visit.

In operation S4, in the event that a new Internet term content exists, the server provides the client with the Internet term content (Internet terms, input strings, term frequencies, related apps, etc.), provides, to the client, the current update time, and issues the time for the next server visit.

In operation S5, the client receives the Internet term content provided by the server and deletes the previous update content. In some embodiments, user-confirmed Internet terms are retained or stored in the dictionary and unconfirmed Internet terms are deleted or removed from the file.

Figure 15A:
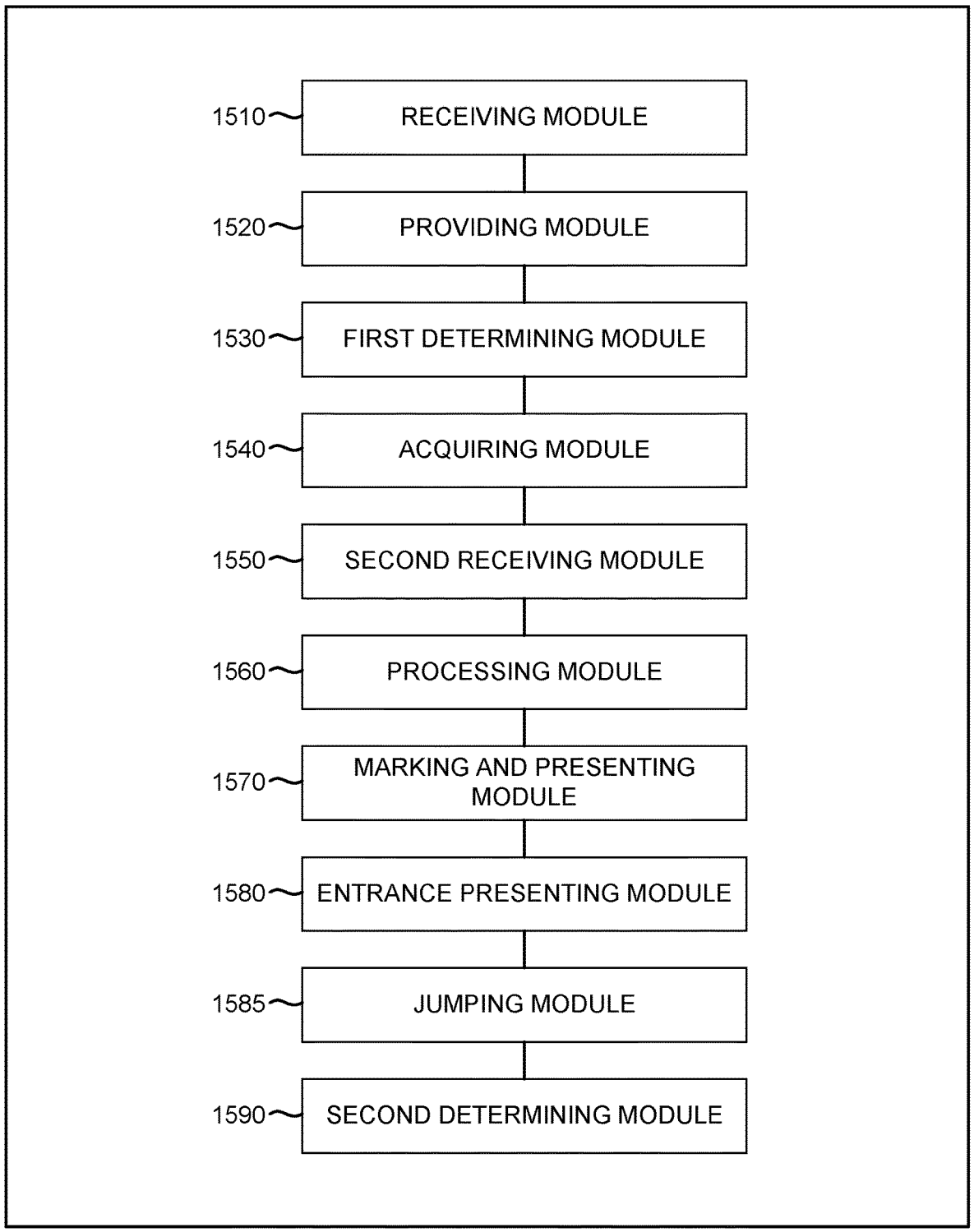
FIG. 15A is a structural diagram of an embodiment of a device for inputting information.

FIG. 15A is a structural diagram of an embodiment of a device for inputting information. In some embodiments, the device 1500 is configured to implement process 100 of FIG. 1 and comprises: a receiving module 1510 and a providing module 1520.

In some embodiments, the receiving module 1510 is configured to receive a first trigger instruction from a user directed at a target candidate that conforms to a preset rule.

In some embodiments, in response to the first trigger instruction, the providing module 1520 is configured to provide, to the user, expansion content corresponding to the target candidate. In some embodiments, the expansion content is content acquired from an app other than the input program.

Figure 15B:
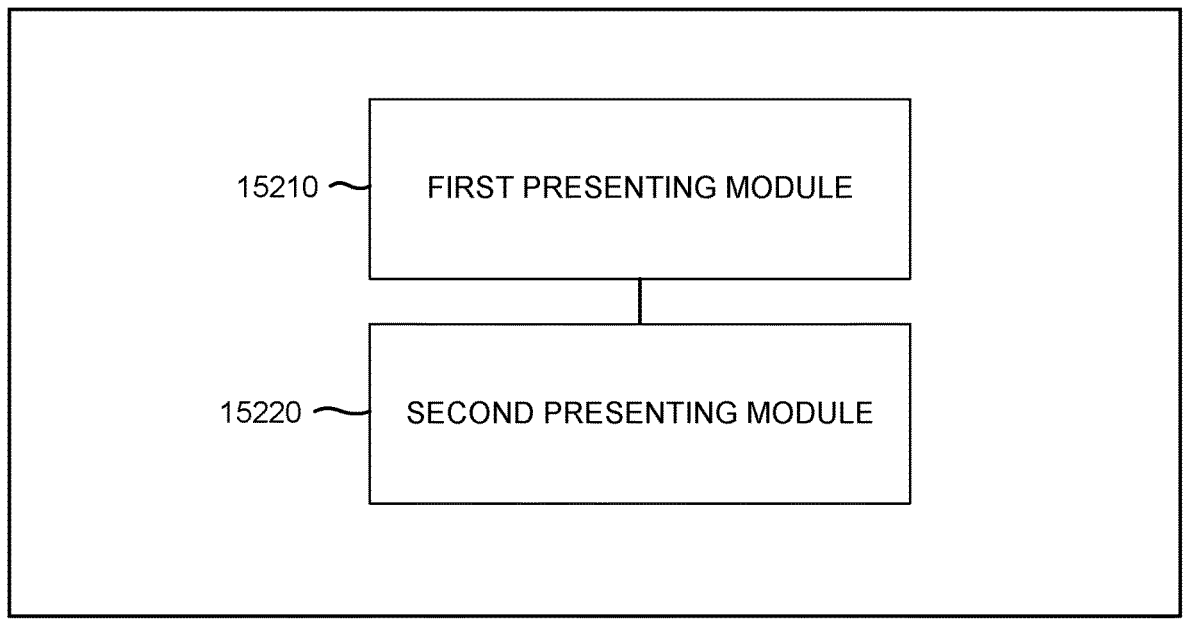
FIG. 15B is a structural diagram of an embodiment of a providing module.

FIG. 15B is a structural diagram of an embodiment of a providing module. In some embodiments, the providing module 15200 is an implementation of the providing module 1520 of FIG. 15A and includes: a first presenting module 15210 and a second presenting module 15220.

In some embodiments, in response to the first trigger instruction, the first presenting module 15210 is configured to present expansion content corresponding to the target candidate.

In some embodiments, in response to the first trigger instruction, the second presenting module 15220 is configured to present a first access entrance to the expansion content corresponding to the target candidate, and present corresponding expansion content based on a second trigger instruction from the user directed at the first access entrance.

In some embodiments, the preset rule includes: a date-related rule, the expansion content corresponding to the target candidate includes current date information.

In some embodiments, the preset rule includes: a terminal identifier-related rule, the expansion content corresponding to the target candidate includes current terminal identifier information.

In some embodiments, the preset rule includes: a geographic location-related rule, the expansion content corresponding to the target candidate includes current geographic location information, at least one geographic location object corresponding to the current geographic location information, or a combination thereof.

In some embodiments, the preset rule includes: a contact-related rule, the expansion content corresponding to the target candidate includes at least one piece of contact directory information corresponding to the target candidate.

In some embodiments, the preset rule corresponds to preset intention types. The preset intention types can include: time-type intentions, date-type intentions, terminal identifier-type intentions, geographic location-type intentions, contact-type intentions, or any combination thereof.

In some embodiments, the device 1500 includes: a first determining module 1530.

In some embodiments, the first determining module 1530 is configured to determine the target candidate that conforms to a preset rule.

In some embodiments, the first determining module 1530 is further configured to match a candidate corresponding to the current input string against intention-type content complying with a preset rule, and in the event that the match is successful, determine the candidate corresponding to the current input string to be the target candidate conforming to the preset rule.

In some embodiments, the device 1500 includes: an acquiring module 1540.

In some embodiments, the acquiring module 1540 is configured to acquire the expansion content from an app other than the input program.

Figure 15C:
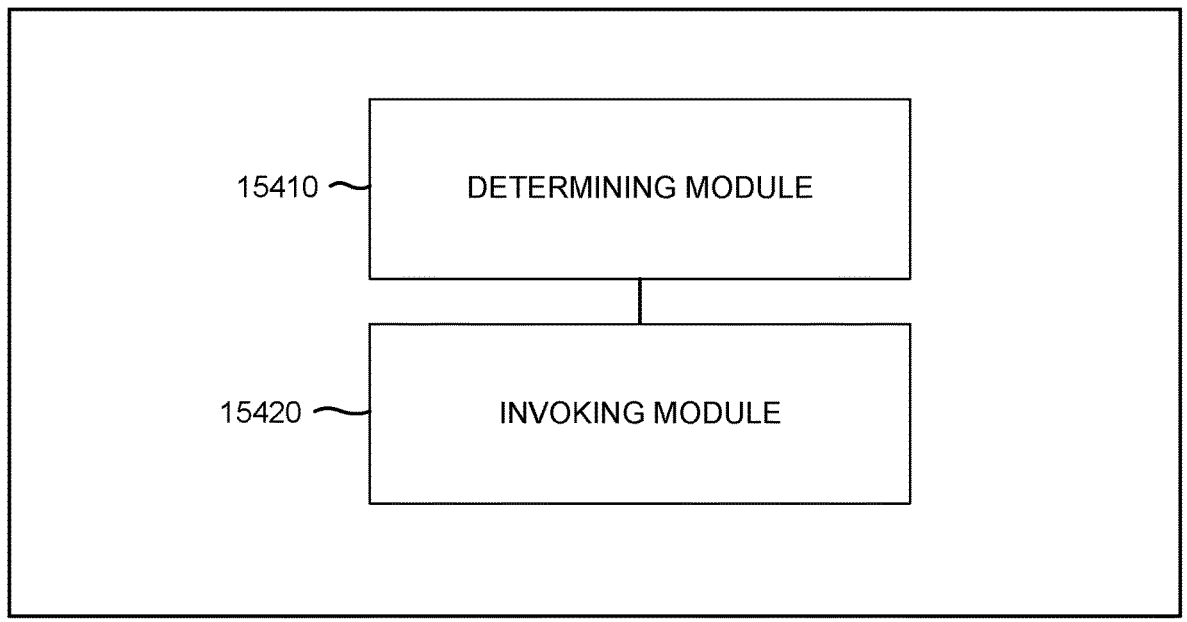
FIG. 15C is a structural diagram of an embodiment of an acquiring module.

FIG. 15C is a structural diagram of an embodiment of an acquiring module. In some embodiments, the acquiring module 15400 is an implementation of the acquiring module 1540 of FIG. 15A and includes: a determining module 15410 and an invoking module 15420.

In some embodiments, the determining module 15410 is configured to determine a corresponding target app based on the preset intention type corresponding to the preset rule.

In some embodiments, the invoking module 15420 is configured to invoke an application programming interface provided by the target app to acquire, from the target app, the expansion content corresponding to the target candidate.

In some embodiments, the preset rule includes: a geographic location-related rule.

Figure 15D:
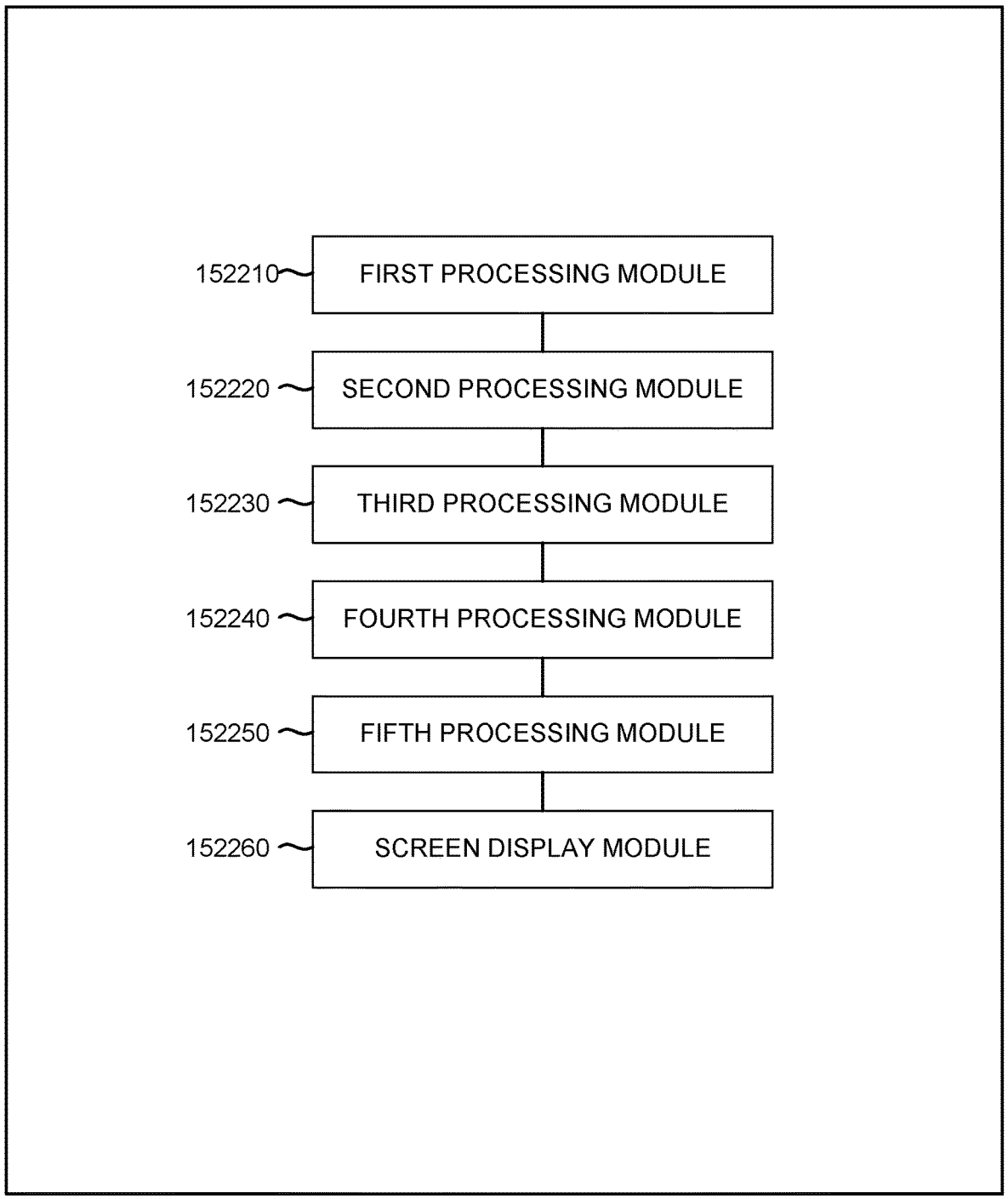
FIG. 15D is a structural diagram of an embodiment of a second presenting module.

FIG. 15D is a structural diagram of an embodiment of a second presenting module. In some embodiments, the second presenting module 152200 is an implementation of the second presenting module 15220 of FIG. 15B and includes:

a first processing module 152210, a second processing module 152220, a third processing module 152230, a fourth processing module 152240, a fifth processing module 152250, and a screen display module 152260.

In some embodiments, in response to receiving the first trigger instruction, the first processing module 152210 is configured to put the target candidate at the top of a screen, and present a positioning identifier.

In some embodiments, in response to a second trigger instruction from the user for the positioning identifier, the second processing module 152220 is configured to put the current geographic location information corresponding to the target candidate or the geographic location object corresponding to the current geographic location information at the top of a screen, or a combination thereof, or present the current geographic location information corresponding to the target candidate, at least one geographic location object corresponding to the current geographic location information, or a combination thereof.

In some embodiments, the preset rule includes: a contact-related rule, the expansion content corresponding to the target candidate includes: at least one piece of contact directory information corresponding to the target candidate.

In some embodiments, in response to the first trigger instruction, the third processing module 152230 is configured to present a contact directory identifier.

In some embodiments, in response to a second trigger instruction from the user for the contact directory identifier, the fourth processing module 152240 is configured to select, from the expansion content corresponding to the target candidate, a preset quantity of first expansion content and present the preset quantity of first expansion content.

In some embodiments, in response to a user swipe instruction, the fifth processing module 152250 is configured to select, from the expansion content corresponding to the target candidate, the expansion content excluding the first expansion content and present the expansion content excluding the first expansion content.

In some embodiments, in response to a selection instruction from the user for the expansion content, the screen display module 152260 is configured to put the expansion content corresponding to the selection instruction at the top of a screen.

In some embodiments, the device 1500 further includes: a second receiving module 1550

In some embodiments, the second receiving module 1550 is configured to receive a selection instruction from the user for the expansion content.

In some embodiments, the second receiving module 1550 is configured to perform at least one of the following:

A) upon presenting the at least one piece of contact directory information, present a select-all control corresponding to the at least one piece of contact directory information, and in response to a trigger instruction from the user for the select-all control, obtain a selection instruction from the user for all the contact directory information;

B) obtain a selection instruction from the user for a single piece of contact directory information in response to a trigger instruction from the user for the single piece of contact directory information; or C) present a color-modified display of a single piece of contact directory information in response to a trigger instruction from the user for the single piece of contact directory information, and in response to a trigger instruction from the user for a single piece of contact information presented in modified colors, obtain a selection instruction from the user for the single piece of contact directory information.

In some embodiments, the device 1500 further includes: a processing module 1560.

In some embodiments, the processing module 1560 is configured to respond to the first trigger instruction by putting the target candidate at the top of the screen, and while presenting the expansion content corresponding to the target candidate or the first access entrance for the expansion content, present association content corresponding to the target candidate.

In some embodiments, the device 1500 further includes: a marking and presenting module 1570.

In some embodiments, the marking and presenting module 1570 is configured to implement a marked presentation of the target candidate that conforms to a preset rule before the receiving of the first trigger instruction from the user directed at the target candidate that conforms to a preset rule and during the presenting of the candidates.

In some embodiments, the marking and presenting module 1570 is further configured to perform at least one of the following:

A) mark a font or color of the target candidate and thereby mark and present the target candidate that conforms to the preset rule.

B) present the target candidate complying with the preset rule and simultaneously present an identifier for the target candidate.

In some embodiments, the preset rule includes: an Internet term-related rule.

In some embodiments, the device 1500 further includes: an entrance presenting module 1580, a jumping module 1585, and a second determining module 1590.

In some embodiments, the entrance presenting module 1580 is configured to respond to the first trigger instruction by presenting a second access entrance for a related app corresponding to the target candidate.

In some embodiments, the jumping module 1585 is configured to respond to a third trigger instruction from the user for the second access entrance by jumping to the related app and a page corresponding to the target candidate.

In some embodiments, the second determining module 1590 is configured to determine the target candidate that conforms to an Internet term-related rule.

In some embodiments, the second determining module 1590 is further configured to query pre-established mapping relationships between input strings and Internet terms based on the current input string, and regard Internet terms corresponding to the current input string as the target candidate conforming to the Internet term-related rule.

Because the device 1500 corresponds to the embodiments of the processes of FIGS. 1-3B, 6A-6C, and 9, the device 1500 is described in simpler terms. Please refer to the corresponding description in a corresponding process as necessary.

The modules described above can be implemented as software components executing on one or more general purpose processors, as hardware such as programmable logic devices and/or Application Specific Integrated Circuits designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.)

implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 16:
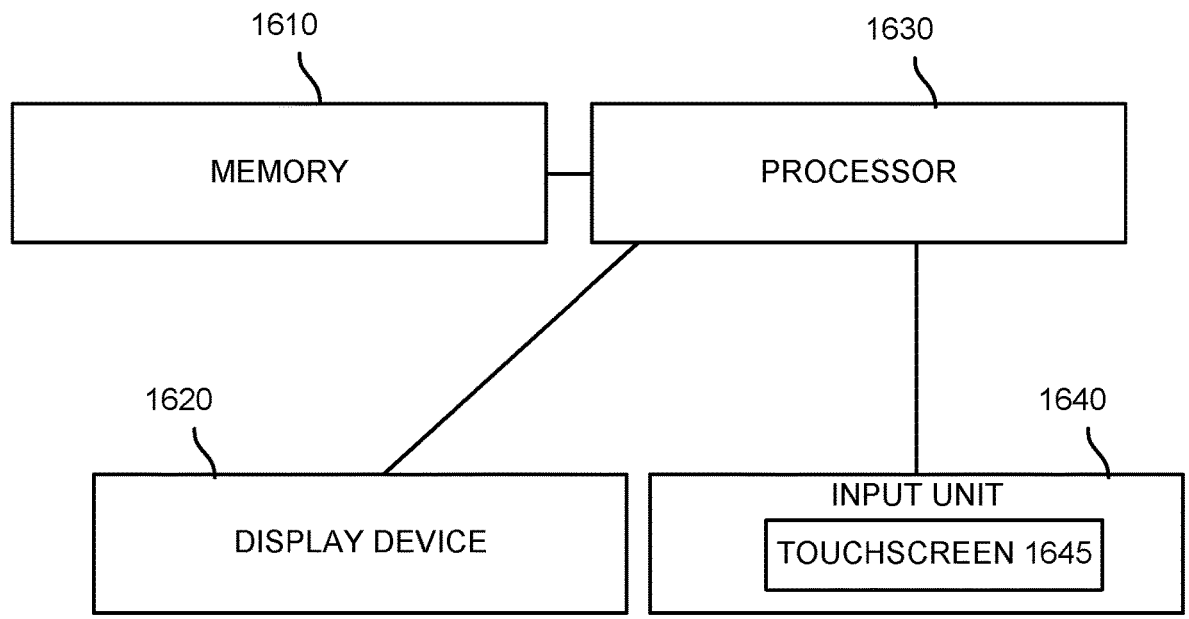
FIG. 16 is a structural diagram of an embodiment of a smart terminal.

FIG. 16 is a structural diagram of an embodiment of a smart terminal. In some embodiments, the smart terminal 1600 is configured to implement process 100 of FIG. 1 and comprises: a memory 1610, a display device 1620, a processor 1630, an input unit 1640, and a touchscreen 1645.

The input unit 1640 is configured to receive numeric or character information input from the user and control signals. In some embodiments, the input unit 1640 includes a touchscreen 1645 configured to collect touch operations performed by the user on the touchscreen 1645 or nearby. For example, the user uses a finger, a touch pen, or any suitable object or accessory to perform operations on the touchscreen 1645. Moreover, the input unit 1640 is configured to drive the appropriate connected devices based on a preset program. In some embodiments, the input unit 1640 includes other input devices in addition to the touchscreen 1645. Examples of other input devices include a physical keyboard, function keys (e.g., a volume control key or a switch key), a mouse, etc.

The display device 1620 can include a display panel. In some embodiments, the display panel 1620 is a liquid crystal display (LCD), an organic light-emitting diode (OLED), or some other form. The touchscreen 1645 can be covered by a display panel to form a touch-display screen. After the touch-display screen detects a touch operation on the touch-display screen or nearby, the touch-display screen can transmit the touch operation to the processor 1630 to perform the appropriate processing.

In some embodiments, by invoking a program, a module, data stored in the memory 1610, or any combination thereof, the processor 1630 receives a first trigger instruction from the user directed at a target candidate conforming to a preset rule. In response to the first trigger instruction, the display device 1620 provides, to the user, expansion content corresponding to the target candidate. In some embodiments, the expansion content is content acquired from an app other than the input program.

Figure 17:
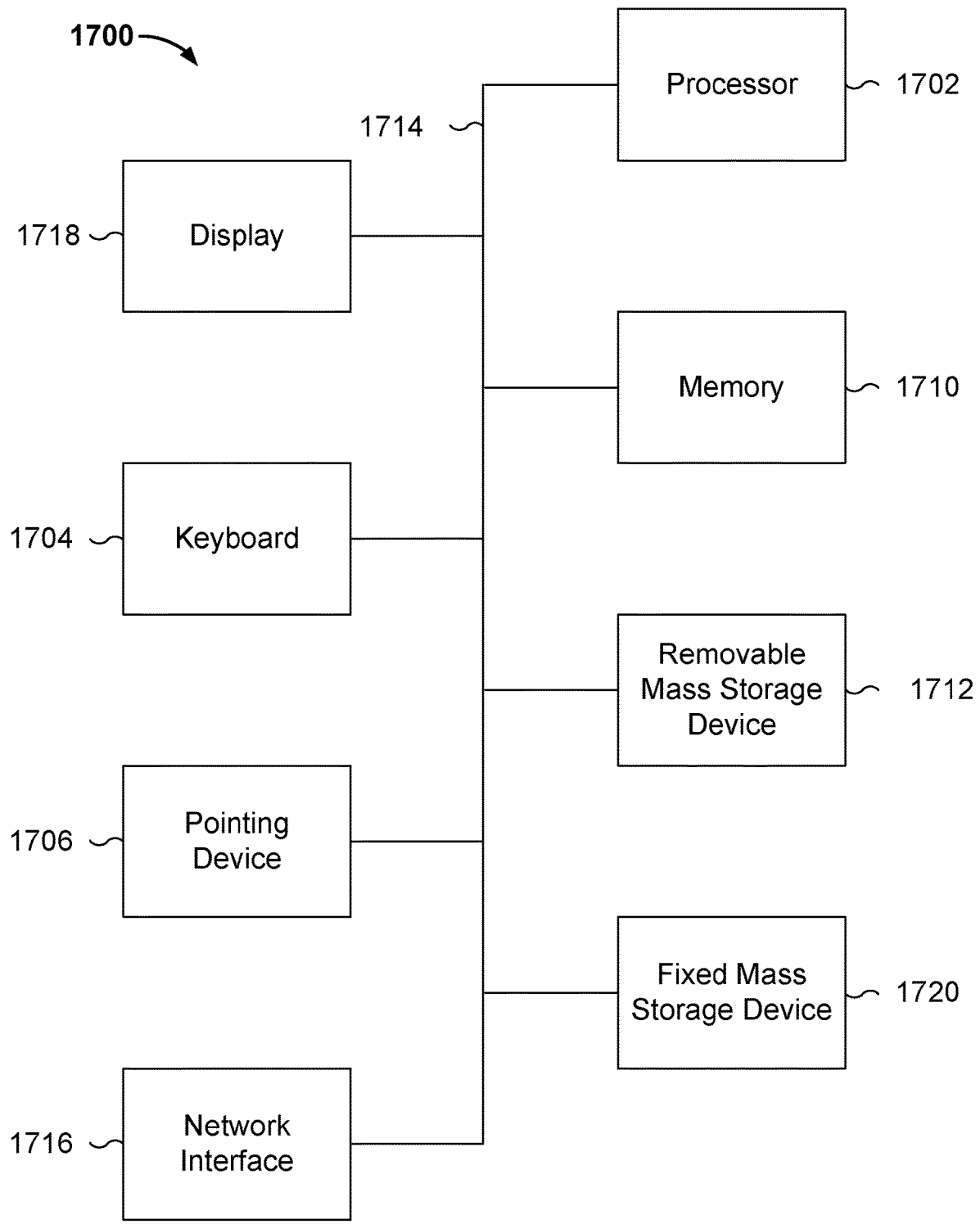
FIG. 17 is a functional diagram illustrating an embodiment of a programmed computer system for inputting information.

FIG. 17 is a functional diagram illustrating an embodiment of a programmed computer system for inputting information. As will be apparent, other computer system architectures and configurations can be used for inputting information. Computer system 1700, which includes various subsystems as described below, includes at least one microprocessor subsystem (also referred to as a processor or a central processing unit (CPU)) 1702. For example, processor 1702 can be implemented by a single-chip processor or by multiple processors. In some embodiments, processor 1702 is a general purpose digital processor that controls the operation of the computer system 1700. Using instructions retrieved from memory 1710, the processor 1702 controls the reception and manipulation of input data, and the output and display of data on output devices (e.g., display 1718).

Processor 1702 is coupled bi-directionally with memory 1710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1702. Also as is well known in the art, primary storage typically includes basic operating instructions, program code, data, and objects used by the processor 1702 to perform its functions (e.g., programmed instructions). For example, memory 1710 can include any suitable computer-readable storage media, described below, depending on whether, for example, data access needs to be bi-directional or uni-directional. For example, processor 1702 can also directly and very rapidly retrieve and store frequently needed data in a cache memory (not shown).

A removable mass storage device 1712 provides additional data storage capacity for the computer system 1700, and is coupled either bi-directionally (read/write) or uni-directionally (read only) to processor 1702. For example, storage 1712 can also include computer-readable media such as magnetic tape, flash memory, PC-CARDS, portable mass storage devices, holographic storage devices, and other storage devices. A fixed mass storage 1720 can also, for example, provide additional data storage capacity. The most common example of mass storage 1720 is a hard disk drive. Mass storages 1712 and 1720 generally store additional programming instructions, data, and the like that typically are not in active use by the processor 1702. It will be appreciated that the information retained within mass storages 1712 and 1720 can be incorporated, if needed, in standard fashion as part of memory 1710 (e.g., RAM) as virtual memory.

In addition to providing processor 1702 access to storage subsystems, bus 1714 can also be used to provide access to other subsystems and devices. As shown, these can include a display monitor 1718, a network interface 1716, a keyboard 1704, and a pointing device 1706, as well as an auxiliary input/output device interface, a sound card, speakers, and other subsystems as needed. For example, the pointing device 1706 can be a mouse, stylus, track ball, or tablet, and is useful for interacting with a graphical user interface.

The network interface 1716 allows processor 1702 to be coupled to another computer, computer network, or telecommunications network using a network connection as shown. For example, through the network interface 1716, the processor 1702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1702 can be used to connect the computer system 1700 to an external network and transfer data according to standard protocols. For example, various process embodiments disclosed herein can be executed on processor 1702, or can be performed across a network such as the Internet, intranet networks, or local area networks, in conjunction with a remote processor that shares a portion of the processing. Additional mass storage devices (not shown) can also be connected to processor 1702 through network interface 1716.

An auxiliary I/O device interface (not shown) can be used in conjunction with computer system 1700. The auxiliary I/O device interface can include general and customized interfaces that allow the processor 1702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 17 is but an example of a computer system suitable for use with the various embodiments disclosed herein. Other computer systems suitable for such use can include additional or fewer subsystems. In addition, bus 1714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a user input comprising a first string;
presenting a plurality of candidates corresponding to the first string;
receiving a first trigger instruction directed at a target candidate among the plurality of candidates, the target candidate conforming to a preset rule, wherein the preset rule comprises: a contact-related rule, and wherein the preset rule comprises a time-type intention, a date-type intention, a terminal identifier-type intention, a geographic location-type intention, a contact-type intention, or any combination thereof; and
in response to the first trigger instruction, automatically providing expansion content corresponding to the target candidate, wherein the expansion content is content acquired from an application (app) other than an input program, wherein the expansion content comprises a specific type of information that corresponds to a type of intention included in the preset rule, wherein the expansion content corresponding to the target candidate comprises: at least one piece of contact directory information corresponding to the target candidate, and wherein the providing of the expansion content corresponding to the target candidate comprises:
in response to the first trigger instruction, presenting the expansion content corresponding to the target candidate, comprising:
in response to a second trigger instruction from a user for a contact directory identifier:
selecting, from the expansion content corresponding to the target candidate, a preset quantity of first expansion content; and
presenting the preset quantity of first expansion content; and
in response to a user swipe instruction:
selecting, from the expansion content corresponding to the target candidate, expansion content excluding the selected preset quantity of first expansion content; and presenting the selected expansion content excluding the selected preset quantity of first expansion content.

2. The method as described in claim 1, further comprising:
determining the target candidate conforming to the preset rule, comprising:
comparing a candidate corresponding to a current input string with intention-type content conforming to the preset rule; and
in the event that the candidate corresponding to the current input string matches the intention-type content conforming to the preset rule, determining the candidate corresponding to the current input string to be the target candidate conforming to the preset rule.

3. The method as described in claim 1, further comprising:
acquiring the expansion content from the app other than the input program, comprising:
determining a corresponding target app based on a preset intention type corresponding to the preset rule; and
invoking an application programming interface (API) provided by the target app, and acquiring, from the target app, the expansion content corresponding to the target candidate.

4. The method as described in claim 1, further comprising:
in response to a selection instruction by the user for the expansion content, putting expansion content corresponding to the selection instruction at the top of a screen.

5. The method as described in claim 4, wherein:
the method further comprises:
receiving the selection instruction from the user for the expansion content, comprising:
A) in response to a trigger instruction for a select-all control, obtaining a selection instruction for all the contact directory information; or
B) in response to a trigger instruction for a single piece of contact directory information, obtaining a selection instruction from the user for the single piece of contact directory information; or
C) in response to a trigger instruction for a single piece of contact directory information, presenting a color-modified display of the single piece of contact directory information; and
in response to the trigger instruction for the single piece of contact directory information presented in modified colors, obtaining a selection instruction from the user for the single piece of contact directory information.

6. The method as described in claim 1, further comprising:
before the receiving of the first trigger instruction for the target candidate conforming to the preset rule:
presenting candidates; and
marking and presenting the target candidate that conforms to the preset rule.

7. The method as described in claim 6, wherein the marking and the presenting of the target candidate that conforms to the preset rule comprises marking a font or color of the target candidate.

8. The method as described in claim 6, wherein while presenting the target candidate conforming to the preset rule, presenting an identifier for the target candidate.

9. The method of claim 1, wherein the first string comprises a pingyin string and the plurality of candidates comprises Chinese character strings that correspond to the pingyin string.

10. The method as described in claim 1, wherein the expansion content comprises current time information in the event that the preset rule includes the time-type intention, the expansion content comprises current date information in the event that the preset rule includes the date-type intention, the expansion content comprises current terminal identifier information in the event that the preset rule includes the terminal identifier-type intention, the expansion content comprises current geographic location information, at least one geographic location object corresponding to the current geographic location information, or both in the event that the preset rule includes the geographic location-type intention, or the expansion content comprises at least one piece of contact directory information corresponding to the target candidate in the event that the preset rule includes the contact-type intention.

11. The method as described in claim 1, wherein the providing of the expansion content corresponding to the target candidate comprises:
in response to the first trigger instruction:
presenting a first access entrance to the expansion content corresponding to the target candidate; and
presenting the corresponding expansion content based on a second trigger instruction from the user directed at the first access entrance.

12. The method as described in claim 11, wherein:
the preset rule comprises: a geographic location-related rule;
the presenting of the first access entrance to the expansion content corresponding to the target candidate comprises:
in response to the first trigger instruction:
displaying the target candidate; and
presenting a positioning identifier; and
the presenting of the corresponding expansion content comprises:
in response to the second trigger instruction from the user for the positioning identifier, displaying a current geographic location information corresponding to the target candidate, a geographic location object corresponding to the current geographic location information, or both; or
displaying the current geographic location information corresponding to the target candidate, at least one geographic location object corresponding to the current geographic location information, or both.

13. The method as described in claim 11, further comprising:
in response to the first trigger instruction:
putting the target candidate at the top of a screen; and
while presenting expansion content corresponding to the target candidate or the first access entrance for the expansion content, presenting association content corresponding to the target candidate, the association content being obtained by an input program based on a pre-established correspondence between the target candidate and the association content.

14. The method as described in claim 11, wherein:
the preset rule comprises an Internet term-related rule; and
the method further comprises:
in response to the first trigger instruction, presenting a second access entrance for a related app corresponding to the target candidate; and
in response to a third trigger instruction from the user for the second access entrance, jumping to the related app and a page corresponding to the target candidate.

15. The method as described in claim 14, further comprising:
determining the target candidate conforming to the Internet term-related rule, comprising:
querying pre-established mapping relationships between input strings and Internet terms based on a current input string; and
regarding an Internet term corresponding to the current input string as the target candidate conforming to the Internet term-related rule.

16. The method as described in claim 11, wherein the presenting of the first access entrance to the expansion content corresponding to the target candidate comprises:
in response to the first trigger instruction, presenting a contact directory identifier.

17. A system, comprising:
a processor; and
a memory coupled with the processor, wherein the memory is configured to provide the processor with instructions which when executed cause the processor to:
receive a user input comprising a first string;
present a plurality of candidates corresponding to the first string;
receive a first trigger instruction directed at a target candidate among the plurality of candidates, the target candidate conforming to a preset rule, wherein the preset rule comprises: a contact-related rule, and wherein the preset rule comprises a time-type intention, a date-type intention, a terminal identifier-type intention, a geographic location-type intention, a contact-type intention, or any combination thereof; and
in response to the first trigger instruction, automatically provide expansion content corresponding to the target candidate, wherein the expansion content is content acquired from an application (app) other than an input program, wherein the expansion content comprises a specific type of information that corresponds to a type of intention included in the preset rule, wherein the expansion content corresponding to the target candidate comprises: at least one piece of contact directory information corresponding to the target candidate, and wherein the providing of the expansion content corresponding to the target candidate comprises to:
in response to the first trigger instruction, present the expansion content corresponding to the target candidate, comprising to:
in response to a second trigger instruction from a user for a contact directory identifier:
select, from the expansion content corresponding to the target candidate, a preset quantity of first expansion content; and
present the preset quantity of first expansion content; and
in response to a user swipe instruction:
select, from the expansion content corresponding to the target candidate, expansion content excluding the selected preset quantity of first expansion content; and present the selected expansion content excluding the selected preset quantity of first expansion content.
18. The system as described in claim 17, wherein:
the preset rule comprises a time-related rule and the expansion content corresponding to the target candidate comprises current time information; or
the preset rule comprises a date-related rule and the expansion content corresponding to the target candidate comprises current date information; or
the preset rule comprises a terminal identifier-related rule and the expansion content corresponding to the target candidate comprises current terminal identifier information; or
the preset rule comprises a geographic location-related rule and the expansion content corresponding to the target candidate comprises current geographic location information, at least one geographic location object corresponding to the current geographic location information, or a combination thereof.
19. The system as described in claim 17, wherein the processor is further configured to:
determine the target candidate conforming to the preset rule, comprising to:
compare a candidate corresponding to a current input string with intention-type content conforming to the preset rule; and
in the event that the candidate corresponding to the current input string matches the intention-type content conforming to the preset rule, determine the candidate corresponding to the current input string to be the target candidate conforming to the preset rule.
20. The system as described in claim 17, wherein the processor is further configured to:
acquire the expansion content from the app other than the input program, comprising to:
determine a corresponding target app based on a preset intention type corresponding to the preset rule; and
invoke an application programming interface (API) provided by the target app, and acquiring, from the target app, the expansion content corresponding to the target candidate.
21. The system as described in claim 17, wherein the processor is further configured to:
in response to a selection instruction by the user for the expansion content, put expansion content corresponding to the selection instruction at the top of a screen.
22. The system as described in claim 21, wherein:
the processor is further configured to:
receive the selection instruction from the user for the expansion content, comprising to:
A) in response to a trigger instruction for a select-all control, obtain a selection instruction from the user for all the contact directory information; or
B) in response to a trigger instruction from the user for a single piece of contact directory information, obtain a selection instruction for the single piece of contact directory information; or
C) in response to a trigger instruction for a single piece of contact directory information, present a color-modified display of the single piece of contact directory information; and
in response to the trigger instruction for the single piece of contact directory information presented in modified colors, obtain a selection instruction from the user for the single piece of contact directory information.

23. The system as described in claim 17, wherein the providing of the expansion content corresponding to the target candidate comprises to:
in response to the first trigger instruction:
present a first access entrance to the expansion content corresponding to the target candidate; and
present the corresponding expansion content based on a second trigger instruction from the user directed at the first access entrance.
24. The system as described in claim 23, wherein:
the preset rule comprises: a geographic location-related rule;
the presenting of the first access entrance to the expansion content corresponding to the target candidate comprises to:
in response to the first trigger instruction:
display the target candidate; and
present a positioning identifier; and
the presenting of the corresponding expansion content comprises to:
in response to the second trigger instruction from the user for the positioning identifier, display a current geographic location information corresponding to the target candidate, a geographic location object corresponding to the current geographic location information, or both; or
present the current geographic location information corresponding to the target candidate, at least one geographic location object corresponding to the current geographic location information, or both.
25. The system as described in claim 23, wherein the processor is further configured to:
in response to the first trigger instruction:
put the target candidate at the top of a screen; and
while presenting expansion content corresponding to the target candidate or the first access entrance for the expansion content, present association content corresponding to the target candidate, the association content being obtained by an input program based on a pre-established correspondence between the target candidate and the association content.
26. The system as described in claim 23, wherein the presenting of the first access entrance to the expansion content corresponding to the target candidate comprises to:
in response to the first trigger instruction, present a contact directory identifier.
27. A smart terminal, comprising:
a memory; and
one or more programs, wherein the one or more programs are stored in the memory and are configured such that one or more processors execute instructions to perform operations below included in the one or more programs:
receiving a user input comprising a first string;
presenting a plurality of candidates corresponding to the first string;
receiving a first trigger instruction directed at a target candidate among the plurality of candidates, the target candidate conforming to a preset rule, wherein the preset rule comprises: a contact-related rule, and wherein the preset rule comprises a time-type intention, a date-type intention, a terminal identifier-type intention, a geographic location-type intention, a contact-type intention, or any combination thereof; and
in response to the first trigger instruction, automatically providing expansion content corresponding to the target candidate, wherein the expansion content is content acquired from an application (app) other than an input program, wherein the expansion content comprises a specific type of information that corresponds to a type of intention included in the preset rule, wherein the expansion content corresponding to the target candidate comprises: at least one piece of contact directory information corresponding to the target candidate, and wherein the providing of the expansion content corresponding to the target candidate comprises to:

in response to the first trigger instruction, present the expansion content corresponding to the target candidate, comprising to:
in response to a second trigger instruction from a user for a contact directory identifier:
select, from the expansion content corresponding to the target candidate, a preset quantity of first expansion content; and
present the preset quantity of first expansion content; and
in response to a user swipe instruction:
select, from the expansion content corresponding to the target candidate, expansion content excluding the selected preset quantity of first expansion content; and
present the selected expansion content excluding the selected preset quantity of first expansion content.

28. A non-transitory computer readable medium and comprising computer instructions for:
receiving a user input comprising a first string;
presenting a plurality of candidates corresponding to the first string;
receiving a first trigger instruction directed at a target candidate among the plurality of candidates, the target candidate conforming to a preset rule, wherein the preset rule comprises: a contact-related rule, and wherein the preset rule comprises a time-type intention, a date-type intention, a terminal identifier-type intention, a geographic location-type intention, a contact-type intention, or any combination thereof; and
in response to the first trigger instruction, automatically providing expansion content corresponding to the target candidate, wherein the expansion content is content acquired from an application (app) other than an input program, wherein the expansion content comprises a specific type of information that corresponds to a type of intention included in the preset rule, wherein the expansion content corresponding to the target candidate comprises: at least one piece of contact directory information corresponding to the target candidate, and wherein the providing of the expansion content corresponding to the target candidate comprises:

in response to the first trigger instruction, presenting the expansion content corresponding to the target candidate, comprising:
in response to a second trigger instruction from a user for a contact directory identifier:
selecting, from the expansion content corresponding to the target candidate, a preset quantity of first expansion content; and
presenting the preset quantity of first expansion content; and
in response to a user swipe instruction:
selecting, from the expansion content corresponding to the target candidate, expansion content excluding the selected preset quantity of first expansion content; and
presenting the selected expansion content excluding the selected preset quantity of first expansion content.

* * * * *